(12) United States Patent
Pelliccia et al.

(10) Patent No.: US 12,181,155 B2
(45) Date of Patent: Dec. 31, 2024

(54) COOKING OVEN WITH STEAM GENERATOR

(71) Applicant: ELECTROLUX PROFESSIONAL S.P.A., Pordenone (IT)

(72) Inventors: Davide Pelliccia, Pordenone (IT);
Michele Simonato, Pordenone (IT);
Mirko Sfreddo, Pordenone (IT); Fabio Burlon, Pordenone (IT); Denis Marson, Pordenone (IT); Franco Tassan Mangina, Pordenone (IT);
Alberto Foda, Pordenone (IT); Antonio Asquini, Pordenone (IT); Riccardo Furlanetto, Pordenone (IT)

(73) Assignee: Electrolux Professional S.P.A., Pordenone (IT)

( * ) Notice: Subject to any disclaimer, the term of this patent is extended or adjusted under 35 U.S.C. 154(b) by 177 days.

(21) Appl. No.: 17/422,055

(22) PCT Filed: Feb. 21, 2020

(86) PCT No.: PCT/EP2020/054692
§ 371 (c)(1),
(2) Date: Jul. 9, 2021

(87) PCT Pub. No.: WO2020/173841
PCT Pub. Date: Sep. 3, 2020

(65) Prior Publication Data
US 2022/0120446 A1  Apr. 21, 2022

(30) Foreign Application Priority Data

Feb. 26, 2019 (EP) ..................................... 19159483
Feb. 26, 2019 (EP) ..................................... 19159485

(51) Int. Cl.
*F24C 14/00* (2006.01)
*A47J 27/04* (2006.01)
(Continued)

(52) U.S. Cl.
CPC ............. *F24C 14/005* (2013.01); *A47J 27/04* (2013.01); *A47J 27/16* (2013.01); *B08B 9/093* (2013.01);
(Continued)

(58) Field of Classification Search
None
See application file for complete search history.

(56) References Cited

U.S. PATENT DOCUMENTS 6,213,002 B1 * 4/2001 Batten et al. ........... A47J 27/04
99/340
8,997,730 B2 * 4/2015 Kulakowski et al. .. F24C 15/00
(Continued)

FOREIGN PATENT DOCUMENTS

| CN | 108431506 A | * | 8/2018 | .............. F24C 14/00 |
| DE | 10157808 A1 | * | 6/2003 | ............... A21B 3/04 |

(Continued)

OTHER PUBLICATIONS

Machine translation of KR 20130027863 A performed on May 9, 2023, Hwang et al. (Year: 2013).*

(Continued)

*Primary Examiner* — Dana Ross
*Assistant Examiner* — Kevin Guanhua Wen
(74) *Attorney, Agent, or Firm* — Stites & Harbison, PLLC; David W. Nagle, Jr.

(57) ABSTRACT

The present invention is a cooking oven for foodstuffs, comprising: a cooking chamber, wherein foodstuffs can be placed for being cooked, having a bottom wall provided with a first cooking chamber outlet positioned in such a way to (Continued)

receive grease collected in the bottom wall; a grease conduit configured for draining grease from the cooking chamber, wherein the first cooking chamber outlet is fluidly connected to the grease conduit; a heating device configured for heating the internal of the cooking chamber; and a vapour outlet duct configured for discharging vapour from the cooking chamber. The bottom wall of the cooking chamber is further provided with a second cooking chamber outlet, distinct from the first cooking chamber outlet and fluidly connected to the vapour outlet duct.

26 Claims, 19 Drawing Sheets

(51) Int. Cl.
   *A47J 27/16* (2006.01)
   *B08B 9/093* (2006.01)
   *F24C 15/14* (2006.01)
(52) U.S. Cl.
   CPC ......... *F24C 15/14* (2013.01); *A47J 2027/043* (2013.01); *B08B 2209/08* (2013.01)

(56) References Cited

U.S. PATENT DOCUMENTS

2014/0319119 A1* 10/2014 Raghavan et al. ...... A47J 27/04
2016/0157658 A1    6/2016 Cupp et al.
2018/0070596 A1    3/2018 Kim et al.

FOREIGN PATENT DOCUMENTS

| DE | 102006010460 A1 | 9/2007 | |
| EP | 0388751 A1 * | 9/1990 | ............... A21B 3/04 |
| EP | 0582238 A1 | 2/1994 | |
| EP | 2110606 A2 | 10/2009 | |
| EP | 3002520 A1 | 4/2016 | |
| ES | 2374383 T3 * | 2/2012 | ............ F24C 14/005 |
| FR | 2958725 A1 | 10/2011 | |
| KR | 101217996 B1 | 1/2013 | |
| KR | 20130027863 A * | 3/2013 | ............. F24C 13/00 |
| WO | WO 2005015087 A2 * | 2/2005 | |
| WO | 2015/056063 A1 | 4/2015 | |
| WO | WO 2015164239 A1 * | 10/2015 | ............. F24C 14/00 |
| WO | 2018/044171 A2 | 3/2018 | |

OTHER PUBLICATIONS

Machine translation of CN 108431506 A performed on May 10, 2023, Kim (Year: 2018).*
Machine translation of ES 2374383 T3 performed on Oct. 25, 2023, Segato (Year: 2012).*
Machine translation of DE 10157808 A1 performed on Feb. 21, 2024, Rzemieniuk et al. (Year: 2003).*
European Patent Office, Examination Report issued in corresponding Application No. EP 19159483.7, dated Sep. 14, 2022.

* cited by examiner

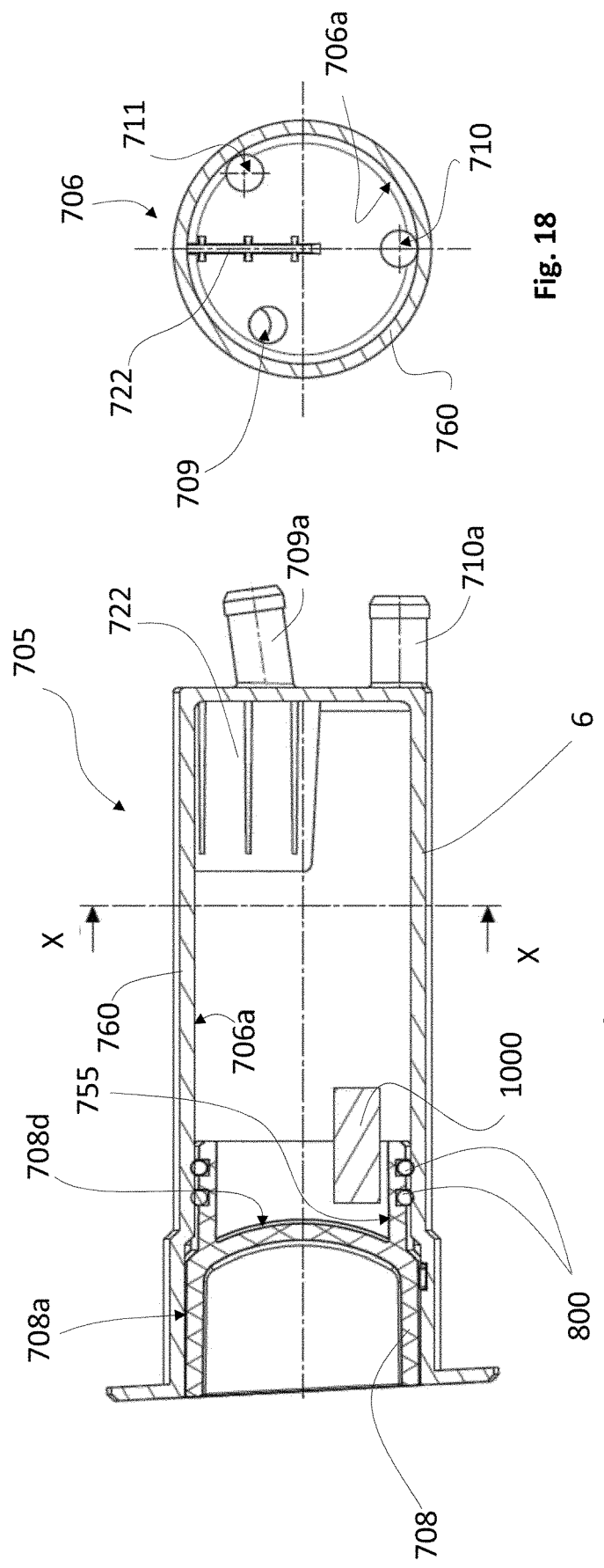

COOKING OVEN WITH STEAM GENERATOR

TECHNICAL FIELD

The present invention relates to an oven for cooking foodstuff, and more in particular to a "professional" oven, i.e. and oven used mainly in professional activities, like restaurants, canteens, hotels, etc.

BACKGROUND ART

Typically, professional ovens for foodstuffs comprise a housing, typically made of steel, containing a cooking chamber wherein foodstuffs can be placed for being cooked.

The cooking chamber is frequently provided with removable trays or racks, where food and/or pots or backing trays containing foodstuff can be placed.

The cooking chamber is typically parallelepipedal, and it is provided with a bottom wall wherein the grease dripping from foodstuff during the cooking is collected, and periodically drained via a cooking chamber outlet fluidly connected, typically via a valve, to a grease container external to the oven.

The oven is also provided with a heating device, e.g. an electric heater, or a gas heater, configured for heating the internal of the cooking chamber.

Typically, professional ovens are also provided with a ventilation system for circulating air within the cooking chamber during the cooking process, so as to make uniform the temperature within the internal of the cooking chamber.

Professional ovens are also typically provided with a vapour outlet duct, configured for discharging vapour (i.e. steam or steam mixed with air and/or gasses) from the cooking chamber during the cooking process; discharging the vapour is essential for keeping the pressure, the humidity, and the temperature within the cooking chamber within prefixed ranges specific for the kind of food to be cooked.

It is underlined that in the present application the word "vapour" has to be understood indiscriminately as pure steam, or as a mixture of steam and air and/or gasses.

The vapour outlet duct is fluidly connected to the internal of the cooking chamber via the same cooking chamber outlet used for draining the grease.

The vapour outlet duct is also typically provided with a quenching system for dehumidifying and cooling down the vapour before discharging it into the external environment; typically, the quenching system comprises a nozzle provided within the vapour outlet duct and positioned in such a way to spray a jet of fresh water against the vapour passing through the vapour outlet duct, so as to cool down the vapour and to condensate the humidity contained therein.

Condensate is drained from the vapour outlet duct via a condensate draining conduit fluidly connected to an oven outlet configured for draining liquid outside the cooking oven.

A problem that affects these professional ovens is that during the cooking process, in particular in case of particularly fat foodstuffs, like for example roasted chicken, the grease dripping from the foodstuff and collected on the bottom wall of the cooking chamber can obstruct the cooking chamber outlet; in this case, the vapour can't reach the vapour outlet duct, and therefore it stays in the internal of the cooking chamber, modifying in an uncontrolled way the internal pressure, humidity and temperature, which can negatively affect the cooking process.

In addition, even if the cooking chamber outlet is not obstructed, grease dripping from the foodstuff and collected into the bottom of the cooking chamber can enter the vapour outlet duct and, from the latter, can reach the condensate drain conduit, with the risk of obstructing the latter; if the condensate drain conduit is clogged, condensate level can increase so much that condensate enters the cooking chamber, with the risk of negatively affecting the cooking process, and/or of damaging the foodstuff or also the cooking chamber.

Many known professional ovens are also equipped with a steam generator which generates steam by heating water up to its boiling point, by means of a heat source immersed in water.

The flow of steam generated by the heat source is then conveyed, through a pipe, into the cooking cavity of the oven, in order to obtain a prefixed humidity degree in the interior thereof.

Typically, the steam generator comprises a liquid container adapted to contain water, and a heat source at least partially arranged in the liquid container for heating water contained therein.

Currently, most of the known steam generators for professional ovens are gas steam generators, called also gas boilers. Such known gas steam generators comprise a combustion chamber wherein a hot exhaust gas is generated by a gas burner, and then conveyed into a heat exchanger at least partially immersed in water.

In known solutions, both the cooking chamber and the steam generator need to be periodically cleaned and in particular they need to be "descaled", i.e. the limestone settled on their internal surfaces have to be removed.

Typically, the descaling of the cooking chamber is performed after a washing procedure comprising a degreasing phase in which a degreasing agent is introduced in the cooking chamber for removing grease form its internal surfaces; the descaling of the cooking chamber can be done during a rinsing phase following the degreasing phase, or in a dedicated descaling phase, in both cases by adding a chemical agent, called "descaler" or "descaling agent", adapted to chemically react with the limestone and to melt it, in such a way that it can be removed by water.

Typically, the descaling of the steam generator is done manually by inserting a descaling agent into the liquid container of the steam generator.

A problem that affects these professional ovens is that the user has to put manually, at different times, two chemical products, not necessarily having the same chemical composition and/or concentration, one in the steam generator and one in the oven cavity; these two separate operations are burdensome and require relatively much time.

In addition, there is the risk that the user uses a wrong additive and/or a wrong concentration of additive in one of the two operations, and or that he/she could forget to perform one of the two operations, with the risk that too much limestone can settle on the internal of the cooking chamber and/or of the steam generator, which could damage such components and/or negatively affecting their performances.

SUMMARY

One aim of the invention is therefore to provide a cooking oven for foodstuff, in particular of the professional type, in which the temperature, humidity and pressure within the cooking chamber during the cooking process can be easily kept within prefixed ranges, also in case of high quantities of grease dripping from the foodstuff being cooked to the bottom of the cooking chamber.

Within this aim, another object of the invention is ensuring that the foodstuff is cooked in an optimal way, even in case of high quantities of grease dripping from the foodstuff being cooked to the bottom of the cooking chamber.

Applicant has found that by providing the bottom wall of the cooking chamber of a cooking oven for cooking foodstuffs with two distinct outlets, one positioned in such a way to collect grease dripping from the foodstuff being cooked, and fluidly connected to a grease conduit configured for draining grease from the cooking chamber, and the other fluidly connected to a vapour outlet duct configured for discharging vapour from the cooking chamber, the risk that grease dripping from the foodstuff during the cooking process and collected into the bottom wall of the cooking chamber can obstruct or clog the vapour outlet duct, and the related above mentioned problems, is highly reduced.

In fact, the grease collected in the bottom wall of the cooking chamber is split up in the two cooking chamber outlets, reducing the amount of grease possibly entering any single cooking chamber outlet, and therefore the probability of clogging. In particular, above aim and objects are solved by a cooking oven for foodstuffs comprising:
- a cooking chamber, wherein foodstuffs can be placed for being cooked, having a bottom wall provided with a first cooking chamber outlet positioned in such a way to receive grease collected in the bottom wall;
- a grease conduit configured for draining grease from the cooking chamber;
- wherein the first cooking chamber outlet is fluidly connected to the grease conduit,
- wherein the cooking oven further comprises:
- a heating device configured for heating the internal of the cooking chamber,
- a vapour outlet duct configured for discharging vapour from the cooking chamber,
- wherein the bottom wall of the cooking chamber is provided with a second cooking chamber outlet, distinct from the first cooking chamber outlet and fluidly connected to the vapour outlet duct.

It is underlined that, since both the cooking chamber outlet are positioned in the bottom of the cooking chamber, their impact on the thermal uniformity within the cooking chamber, and in particular in the region where foodstuff is placed, is very small.

Preferably, the first cooking chamber outlet, i.e. the one connected to the grease conduit, and the second cooking chamber outlet, i.e. the one connected to the vapour outlet duct, are reciprocally positioned and/or arranged, in such a way that the grease collected in the bottom wall of the cooking chamber enters firstly/more easily the first cooking chamber outlet than the second cooking chamber outlet, so that the possibilities that the grease enters the second cooking chamber outlet are highly reduced.

For example, in an advantageous embodiment, the inlet border of the second cooking chamber outlet can be placed at a raised position with respect to the inlet border of the first cooking chamber outlet; this preferred positioning of the inlet border of the second cooking chamber outlet guarantees that if the grease collects in the bottom wall of the cooking chamber, it enters firstly the first cooking chamber, and it is therefore drained to the grease conduit before reaching the level of the inlet border of the second cooking chamber outlet.

In a further advantageous example, the bottom wall of the cooking chamber can be at least partially funnel-shaped, at least at or in proximity to the inlet border of the first cooking chamber outlet, so as to favour the drain of the grease collected in such a region to the first cooking chamber outlet.

Anyway other possible solutions can be used for forcing the grease collected in the bottom wall of the cooking chamber to enter firstly/more easily the first cooking chamber outlet than the second cooking chamber outlet; for example obstacles (e.g. protrusions) can be provided in the bottom wall of the cooking chamber, positioned in such a way to hinder the flow of the grease towards the second cooking chamber outlet and/or to and or to divert the flow towards the first cooking chamber outlet.

In a preferred embodiment, the bottom wall of the cooking chamber has a region, preferably centrally positioned, which is basin-shaped.

More preferably, the first cooking chamber outlet is positioned centrally with respect to this basin-shaped region.

Preferably, if the trays or racks are provided, the first cooking chamber outlet is positioned centrally with respect to overlying trays or racks, so as to effectively receiving grease dripping from the foodstuff positioned on these trays or racks.

In a preferred embodiment, the cooking oven comprises a shield element arranged for preventing grease, in particular grease falling from the overlying foodstuff being cooked, from entering the second cooking chamber outlet.

More preferably, the shield element is positioned over the second cooking chamber outlet, spaced apart from the inlet border of the latter.

Even more preferably, the shield element protrudes from a lateral wall of the cooking chamber.

Preferably, the shield element can be fixed to the lateral wall of the cooking chamber for example by welding and or screwing, and or bolts, etc.

In an advantageous embodiment, the shield element can have a convex shape, preferably a reversed V-shaped cross section, so as to deflect away from the underlying second cooking chamber outlet the grease droplets falling from the foodstuff being cooked.

Advantageously, the vapour outlet duct comprises a vapour outlet valve, for selectively opening/closing the vapour outlet duct, so as to regulate the discharge of the vapour in the external environment.

Advantageously, the cooking oven comprises an oven outlet, configured for draining liquid outside the cooking oven.

Preferably, the oven outlet is provided with an air trap.

In an advantageous embodiment, the grease conduit is selectively connected or connectable to a grease container.

Preferably, the grease conduit is selectively connected or connectable to the grease container via a first valve.

Preferably, the grease conduit is configured for draining grease exiting the first cooking chamber outlet by gravity.

It is underlined, that in the present application "by gravity" means due only to the gravity force, so without the need of a dedicated fluid moving device, like for example a pump.

For example, stating that "the grease conduit is configured for draining grease exiting the first cooking chamber outlet by gravity" means that grease exiting the cooking chamber outlet is taken from the inlet to the outlet of the grease conduit due only to the effect of the gravity force, for example since the inlet is positioned higher than the outlet.

In a preferred embodiment, the grease conduit is oriented vertically, or substantially vertically, when the cooking oven is in its operative position.

It is underlined that in the present application "operative position", is defined as a position in which the oven is installed to be operated, and it lies in a horizontal, or substantial horizontal, plane such as the floor of a room, or the internal bottom wall of a piece of furniture in which the oven is built-in.

In an advantageous embodiment, the cooking oven comprises a vortex preventing device positioned at the first cooking chamber outlet and/or in the grease conduit, and configured for hindering the formation of vortexes in a stream of liquid exiting the cooking chamber via the first cooking chamber outlet.

The vortex preventing device hinders the formation of vortexes in the liquid flow exiting the cooking chamber through the first cooking chamber outlet.

Preferably, a vortex preventing device can be provided also at the second cooking chamber outlet.

Advantageously, the vortex preventing device is an insert having preferably a cross-shaped, or star-shaped cross section, in which a plurality of wings are advantageously defined.

Advantageously, these wings partialize the opening of the first cooking chamber outlet, hindering the formation of vortexes in the liquid flow exiting the cooking chamber through the first cooking chamber outlet.

Advantageously, the vortex preventing device is form-fitted within the first cooking chamber outlet.

In a preferred embodiment, the cooking oven comprises a cleaning system, for cleaning the internal of the oven.

Advantageously, the cleaning system comprises a circulation system configured for pumping liquid out of the cooking chamber and for pumping such liquid, or a part thereof, again in the cooking chamber.

In a preferred embodiment, the first cooking chamber outlet is fluidly connected, in addition to the grease conduit, to the oven outlet.

In a further preferred embodiment, the first cooking chamber outlet is fluidly connected, in addition to the grease conduit, to the circulation system.

In a further preferred embodiment, the second cooking chamber outlet is fluidly connected, in addition to the vapour outlet duct, to the oven outlet.

In a further preferred embodiment, the second cooking chamber outlet is fluidly connected, in addition to the vapour outlet duct, to the grease conduit.

In a further preferred embodiment, the second cooking chamber outlet is fluidly connected to the grease conduit via a connection duct whose end portion protrudes within the grease conduit, substantially perpendicularly to the internal surface of the latter.

This advantageous positioning of the end portion hinders the entrance of grease flowing within the grease conduit by gravity into the end portion; in fact, such a grease flowing in the grease conduit, abuts perpendicularly the external lateral wall of the end portion of the connection duct, and it is very difficult that it can enter the end portion, which requires a longitudinal entrance.

In a preferred embodiment, the second cooking chamber outlet is fluidly connected, in addition to the vapour outlet duct, to the circulation system.

Preferably, the first cooking chamber outlet and the second cooking chamber outlet are selectively connected to the oven outlet via a second valve.

Preferably, the circulation system comprises a circulation pump, an aspiration conduit connecting the circulation pump to the first cooking chamber outlet and/or to the second cooking chamber outlet, and a delivery conduit connecting the circulation pump to a washing/rinsing liquid circulation outlet provided in the cooking chamber and configured for allowing washing/rinsing liquid to enter said cooking chamber.

It is underlined that a washing liquid can be for example water and/or water containing a detergent, while a rinsing liquid can be, for example water and/or water containing a descaling additive, or a brightener.

In an advantageous embodiment, the cleaning system comprises a washing/rinsing liquid introduction system configured for taking washing/rinsing liquid within the cooking chamber.

More preferably, the washing/rinsing liquid introduction system comprises an introduction conduit fluidly connected to the cooking chamber and configured for selectively supplying into the latter washing and/or rinsing liquid.

In a further preferred embodiment, the washing/rinsing liquid introduction system comprises a third valve for controlling the supply of washing and/or rinsing liquid through the introduction conduit.

In an advantageous embodiment, the washing/rinsing liquid circulation outlet and/or the outlet of the introduction conduit are positioned in an upper wall of the cooking chamber.

In an advantageous embodiment, the outlet of the introduction conduit is separated from the washing/rinsing liquid circulation outlet.

In a further advantageous embodiment, the outlet of the introduction conduit into the cooking chamber coincides with the washing/rinsing liquid circulation outlet.

In a further advantageous embodiment, the aspiration conduit is fluidly connected to the second cooking chamber outlet via a by-pass conduit fluidly connecting the aspiration conduit to the vapour outlet duct, to which the second cooking chamber outlet is fluidly connected.

In a further advantageous embodiment, the by-pass conduit is fluidly connected to the grease conduit.

Preferably, the by-pass conduit is fluidly connected to the grease conduit via the above-mentioned connection duct.

Preferably, the cooking oven comprises a drain conduit fluidly connecting the oven outlet to the first cooking chamber outlet and to the second cooking chamber outlet.

More preferably, the drain conduit is fluidly connected to the oven outlet via the second valve.

Still more preferably, the aspiration conduit is selectively fluidly connected to the oven outlet via the drain conduit.

Preferably, the by-pass conduit is selectively fluidly connected to the oven outlet via the drain conduit.

Preferably, the grease conduit is selectively fluidly connected to the oven outlet via the drain conduit.

In an advantageous embodiment, the cooking oven comprises a quenching system for cooling down steam exiting from the cooking chamber.

Preferably, the quenching system comprises a quenching conduit for supplying cooling liquid within the vapour outlet duct.

In a preferred embodiment, the quenching conduit comprises an inlet positioned, in the operative position of the cooking oven, at a higher level with respect to the maximum level that washing/rinsing liquid can reach within the cooking chamber during the washing procedure of the cooking oven; this ensures that, even if washing/rinsing liquid should flow back through the quenching conduit, it wouldn't exit the latter with the risk of contaminating the water mains.

In a preferred embodiment, the vapour outlet duct comprises:
 a bottom region, positioned, in the operative position of the cooking oven, at least partially below the cooking chamber, and fluidly connected downstream of the second cooking chamber outlet,
an end region protruding upwards from the bottom region, from which vapour is released in the environment.

Preferably, the quenching conduit comprises an outlet positioned within the bottom region of the vapour outlet duct; in this way quenching liquid is released in the vapour outlet duct quite far away from its end region. This arrangement of the outlet prevents that quenching liquid (e.g. water) exiting the quenching conduit is taken out of the vapour outlet duct due to the flow of vapour flowing therein.

Preferably, the bottom region of the vapour outlet duct is slightly inclined in such a way that liquid contained therein tends to flow, by gravity, in counter-current with respect to the vapour.

In a preferred embodiment, the by-pass conduit is connected to the vapour outlet duct at or in proximity to the initial region of the bottom region so that, due to the slope of the latter, condensed liquid present in such a bottom region flows by gravity into the by-pass conduit.

In an advantageous embodiment, the outlet of the quenching conduit comprises a quenching nozzle arranged within the bottom region and configured for spraying a jet of water against the vapour exiting the second cooking chamber outlet.

Advantageously, the cooking oven comprises a fourth valve for controlling the supply of cooling water through the quenching conduit.

Advantageously, the cooking oven comprises a perforated suction wall separating the cooking chamber from a heating chamber containing at least partially the heating device and a fan, wherein the fan is configured for circulating heated air through the cooking chamber and the heating chamber.

In an advantageous embodiment, the cooking oven comprises a ventilation pipe fluidly connected to the cooking chamber and configured for selectively taking air from the external environment into the cooking chamber.

Preferably, the ventilation pipe comprises an outlet provided at the heating chamber.

More preferably, the ventilation pipe is provided with a ventilation valve for selectively closing the ventilation pipe.

In an advantageous embodiment, the cooking oven comprises an overflow conduit directly fluidly connecting the vapour outlet duct to the oven outlet, and configured for directly discharging to the oven outlet the liquid present in the vapour outlet duct only if the level of the liquid in the vapour outlet duct exceeds a certain height.

In an advantageous embodiment, the circulation system is fluidly connected to the vapour outlet duct, and it is configured for taking washing/rinsing liquid from said cooking chamber into the vapour outlet duct, so as to wash the latter.

In a preferred embodiment, the cleaning system comprises a washing/rinsing additive supplying system configured for supplying washing and/or rinsing additives to the internal of the cooking chamber.

It is underlined that a washing additive can be, for example, a detergent, while a rinsing additive can be for example a descaling additive, a brightener, etc.

Preferably, the washing/rinsing additive supplying system comprises an additive drawer, loadable with a washing/rinsing additive and selectively fluidly connected or connectable to the circulation system in such a way to selectively supply a washing and/or rinsing additive to the latter.

More preferably, the additive drawer, is selectively fluidly connected or connectable to the aspiration conduit and/or delivery conduit.

Still more preferably, the cooking oven comprises a fifth valve for connecting the additive drawer to water supply mains.

In a further advantageous embodiment, the cooking oven comprises a sixth valve selectively connecting the additive drawer to the aspiration conduit and/or delivery conduit.

In a further advantageous embodiment, the cleaning system comprises a washing/rinsing additive multi-dosing system configured for supplying to the internal of the cooking chamber metered amounts of washing and/or rinsing additives.

Preferably, the washing/rinsing additive multi-dosing system comprises:
one or more washing/rinsing additives containers filled or fillable with an amount of washing and/or rinsing additives sufficient for a plurality of washing/rinsing cycles;
one or more washing/rinsing additives delivery conduits fluidly connecting such one or more washing/rinsing additives containers to the internal of the cooking chamber;
one or more washing/rinsing additives pumps, configured for pumping a washing/rinsing additive out of the one or more washing/rinsing additives containers and delivery the washing/rinsing additives to the cooking chamber via one or more washing/rinsing additives delivery conduits.

In an advantageous embodiment, at least one of the one or more washing/rinsing additives containers is fluidly connected to the additive drawer.

In a further preferred embodiment, at least one of the one or more washing/rinsing additives containers is fluidly connected to the washing/rinsing liquid introduction system.

More preferably all the one or more washing/rinsing additives containers are fluidly connected to the introduction conduit.

Advantageously, the cooking oven comprises a steam supply system configured for producing and supplying steam into the cooking chamber.

Preferably, the steam supply system comprises a boiler configured for producing steam and fluidly connected to the cooking chamber so as to release into the latter the steam.

More preferably, the boiler comprises a water reservoir fillable with water, and a water heater for heating water loaded within the water reservoir.

In an advantageous embodiment, the steam supply system comprises:
a water inlet conduit fluidly connected to the water reservoir and connected or connectable to water mains,
a water outlet conduit fluidly connecting the water reservoir to the oven outlet.

Still preferably, the steam supply system comprises:
a sixth valve associated to the water inlet conduit for controlling the delivery of water to the water reservoir,
a eighth valve associated to the water outlet conduit for controlling the drain of liquid from the reservoir to the oven outlet.

Preferably, the steam supply system comprises a steam duct fluidly connecting the reservoir to the cooking chamber.

In an advantageous embodiment, the cleaning system is configured for supplying a washing/rinsing liquid to the steam supply system.

Preferably, the cleaning system is configured for supplying a washing/rinsing liquid to the boiler.

Preferably, the cleaning system comprises a boiler cleaning conduit, fluidly connecting the washing/rinsing additive supplying system to the boiler.

More preferably, the boiler cleaning conduit fluidly connects the water reservoir to the additive drawer.

Still preferably, the boiler cleaning conduit fluidly connects the water reservoir to the washing/rinsing additive multi-dosing system.

More preferably, the boiler cleaning conduit fluidly connects the water reservoir to one or more of said the or more washing/rinsing additives container.

Preferably, the cooking oven comprises an electronic controller, for example a programmed/programmable electronic board, for controlling one or more (preferably all the) functions of the cooking oven (e.g. the cooking procedure, the washing procedure, the electronic controllable components, etc.).

Another aim of the invention is to provide a cooking oven with a steam generator in which the cleaning, and in particular the descaling of the cooking chamber and of the steam generator can be performed with a minimum user intervention, and in a reliable way.

Within this aim, another object of the invention is providing a cooking oven with a steam generator which is configured for reducing the risk of forgetting to clean, and in particular to descale, one between the cooking chamber and the steam generator or to use a wrong cleaning (descaling) additive for cleaning (and in particular for descaling) one of these two components.

Applicant has found that by providing the oven with a cleaning system having an additive drawer loadable with a washing/rinsing additive, and comprising a liquid inlet configured for taking a liquid within the drawer, and fluidly connected both to the inside of the cooking chamber and to the inside of the steam generator, the user has to load only once the additive in the drawer for cleaning both the cooking chamber and the steam generator. This reduces the number and the complexity of the operations the user has to perform in order to clean the oven, and therefore the time needed for performing such operations is reduced.

In addition, the risk that the user can load a wrong additive, or a wrong concentration of additive, in one between the cooking chamber and the steam generator, or that he/she can forget to clean one of these two components, is highly reduced.

In particular, above aim and objects are solved by a cooking oven comprising:
a cooking chamber wherein foodstuffs can be placed for being cooked,
a steam generator configured for producing steam and fluidly connected to the cooking chamber for releasing steam into the latter;
a cleaning system for cleaning the cooking chamber and the steam generator, comprising an additive drawer loadable with a washing/rinsing additive;
wherein the additive drawer comprises a liquid inlet configured for taking a liquid therein, and is fluidly connected or connectable both to the inside of the cooking chamber and to the inside of the steam generator.

Preferably, the liquid inlet is connected or connectable to a source of water external to the cooking oven.

More preferably, the cooking oven comprises a first valve interposed between the liquid inlet and the source of water external to the cooking oven.

In an advantageous embodiment, the additive drawer comprises:
a first liquid outlet fluidly connecting the inside of the additive drawer to the inside of the cooking chamber;
a second liquid outlet fluidly connecting the inside of the additive drawer to the inside of the steam generator.

In this advantageous embodiment, therefore, a washing/rinsing liquid (i.e. water entered into the drawer via the liquid inlet and mixed with a washing/rinsing additive contained in the drawer) exits the drawer via two separates ways (i.e. the first and second liquid outlets), each connected, preferably autonomously, respectively to the cooking chamber and to the steam generator.

It is underlined that a washing additive can be for example a detergent and/or a degreaser, while a rinsing additive can be for example a brightener and/or a descaling additive.

In a further advantageous embodiment, the additive drawer can be provided with a single liquid outlet connected, for example, to a pipe or tube external to the drawer which branches off in at least two branches, one fluidly connected to the cooking chamber, and the other fluidly connected to the steam generator; in this advantageous embodiment, therefore, a washing/rinsing liquid (i.e. water entered into the drawer via the liquid inlet and mixed with a washing/rinsing additive contained in the drawer) exits the drawer via a single outlet, and then is taken respectively to the cooking chamber and to the steam generator by two pipes or conduits that branches off outside the drawer.

In an advantageous embodiment, the additive drawer comprises:
a hollow housing, wherein a cleaning additive can be loaded, having a first end opened;
a cap configured for being removably fixed to the hollow housing and removably closing the first end of the latter.

Preferably, the cap is configured for entering and being positioned within the first end of the hollow housing and being fixed therein.

Preferably, the cap is fixed or fixable to the hollow body by a bayonet-type or a screw-type closure.

Preferably, the cap is provided with handling device, for facilitating the grapping of the cap. Advantageously, the handling device comprises a couple of wings, advantageously protruding radially from a cylindrical inner surface of the cap which is accessible from the external to the hollow housing when the cap is fixed to the latter.

In an advantageous embodiment, the additive drawer comprises a support for an additive, configured for supporting an additive (preferably in the form of a tab) within the hollow housing when the cap is fixed to the hollow housing. This advantageous embodiment is particularly easy to use, since the user, in order to load, additive within the drawer, has simply to remove the cap, placing the additive in the support of the latter, and close the cap on the drawer.

In a further advantageous embodiment, the additive drawer comprises a sealing system configured for favouring the hermetic closure of the first end of the hollow body by the cap. Preferably, the sealing system is comprised in the cap.

In a further advantageous embodiment, the additive drawer comprises a safety system configured for automatically opening the first end of the hollow body if the internal pressure exceeds a prefixed threshold. This safety system can be particularly useful in some configuration of the oven according to the invention in which the additive drawer works with an internal pressure above atmospheric pressure.

Preferably, the safety system is comprised in the cap.

In a preferred embodiment, the safety system at least partially, more preferably totally, coincides with the sealing system.

In an advantageous embodiment, the cap comprises:
a fixed portion removably fixable to the hollow housing, a closure portion movable with respect to the fixed portion, and configured for being selectively moved, when the fixed portion is fixed to the hollow housing, to a closing position in which it hermetically seals the first end of the hollow housing, an active closure system configured for forcing the closure portion into the closing position when the fixed portion is fixed to the hollow housing.

Advantageously, the sealing system comprises such fixed portion, closure portion, and active closure system.

Preferably, the fixed portion is fixed or fixable to the hollow body by a bayonet-type or a screw-type closure.

Preferably the closure portion abuts, in the closing position, against an abutment provided at the first end of the hollow housing, internally to the latter for hermetically closing such a first end.

Preferably, the closure portion comprises a gasket configured for abutting against such an abutment provided at the first end of the hollow housing, internally to the latter.

In a preferred embodiment, the active closure system is configured for allowing the closure portion to be moved away from the closing position when the pressure within the hollow housing exceeds a prefixed threshold. In this preferred embodiment, the active closure system operates also as a safety system.

In a preferred embodiment, the active closure system comprises a resilient element acting between the fixed portion and the closure portion for exerting an elastic force pushing the closure portion into the closing position when the fixed portion is fixed to the hollow housing.

In a preferred embodiment, the resilient element comprises a coil spring positioned between the fixed portion and the closure portion and configured for being compressed when the fixed portion is fixed to the hollow housing, so as to push the closure portion away from the fixed portion, towards the closing position.

In a further advantageous embodiment, the resilient element can comprise a pneumatic spring.

In an advantageous embodiment, the fixed portion comprises a cylindrical wall, preferably, from which internal surface protrudes an internal septum, advantageously dividing the cylindrical wall in two cylinders.

Preferably, the internal septum comprises a bulge in its central region.

In an advantageous embodiment, the closure portion comprises a disk-shaped portion, configured for abutting, preferably with the interposition of the gasket, with the abutment of the hollow housing.

In an advantageous embodiment, the closure portion comprises a cylindrical portion, protruding from the disk-shaped portion towards the internal septum of the fixed portion, and advantageously positioned within the cylindrical wall of the latter.

Preferably, the coil spring is positioned between the disk-shaped portion of the closure portion and the internal septum of the fixed portion, so as to be compressed between these two elements when the fixed portion is fixed to the hollow housing, and exerting a force on the disk-shaped portion towards the abutment, that ensure the seal between these components.

Preferably, the closure portion is movably associated to the fixed portion by a pin, fixed to the closure portion and slidably supported by the fixed portion; more preferably, the pin is fixed to a central region of the disk-shaped portion, and it is slidably supported by a central region of the internal septum, preferably by the bulge of the latter.

In a further advantageous embodiment, the sealing system advantageously comprises one or more O-rings protruding from the external surface of the cap facing the internal surface of the hollow housing when the cap is fixed to the latter, and adapted to abut against this internal surface for ensuring the watertight of the closure.

In an advantageous embodiment, the hollow housing has a tubular shape, preferably cylindrical, and comprises a lateral wall, the first end of the hollow housing, and a second end, opposite the first end, and closed.

In an advantageous embodiment, the liquid inlet, the first liquid outlet and the second liquid outlet are positioned at the second end of the hollow housing.

In an advantageous embodiment, the hollow housing comprises connection elements, protruding from its second end towards the external of the hollow housing for fluidly connecting, respectively, the liquid inlet, the first liquid outlet and the second liquid outlet, to pipes or tubes external to the additive drawer.

In an advantageous embodiment, the hollow housing comprises a diverting element for diverting a liquid entering the hollow housing from the liquid inlet to the first liquid outlet and/or to the second liquid outlet.

In a preferred embodiment, the diverting element comprises a septum protruding from the internal wall of the second end of the hollow housing towards the internal of the latter, the liquid inlet and at least one between the first liquid outlet and the second liquid outlet being positioned on opposite sides with respect to the septum.

The septum defines an optimised path for the liquid moving from the liquid inlet to the liquid outlets which optimises the dissolution of the additive contained in the hollow housing, in particular if the latter is in form of tabs.

In an advantageous embodiment, the first liquid outlet is connected to the cooking chamber via a first piping system having an outlet into the cooking chamber.

In a preferred embodiment, the additive drawer is positioned, when the cooking oven is in its operative position, higher than a bottom wall of the cooking chamber, and the outlet of the first piping system is positioned, when the cooking oven is in its operative position, lower than the additive drawer, so that a liquid can pass from the inside of the hollow housing to the inside of the cooking chamber by gravity.

Preferably, as shown for example in figure the first liquid outlet is positioned in such to be, when the cooking oven is in its operative position, substantially tangent to the lower region (or internal bottom) of the internal surface of the hollow housing, so that all the liquid present within the latter can exit the first liquid outlet by gravity.

It is underlined again, that in the present application "by gravity" means due only to the gravity force, so without the need of a dedicated fluid moving device, like for example a pump.

It is also underlined that the fact that a certain configuration allows a movement by gravity does not prevent to use also, in addition to the gravity, a mechanical or electromechanical element, like for example a pump, for contributing to that movement.

It is also underlined again that in the present application "operative position", is defined as a position in which the oven is installed to be operated, and it lies in a horizontal, or substantial horizontal, plane such as the floor of a room, or the internal bottom wall of a piece of furniture in which the oven is built-in.

Preferably, the first piping system comprises a second valve interposed between the first liquid outlet of the additive drawer and the outlet of the first piping system.

In a further advantageous embodiment, the oven comprises a first pump configured for taking a liquid from the first liquid outlet of the additive drawer into the cooking chamber via the first piping system.

In this case, the additive drawer can be also positioned below the cooking chamber, since the first pump allows the liquid contained in the additive drawer to be completely drained from the additive drawer and to reach the cooking chamber, even without the effect of the gravity force.

Preferably, the second valve is positioned between the first pump and the first liquid outlet of the additive drawer.

Preferably, the first pump is configured for being able to completely empty the additive drawer via the first liquid outlet.

In a further advantageous embodiment, the first piping system comprises a circulation system configured for pumping liquid out of the cooking chamber and for pumping such liquid, or a part thereof, again in the cooking chamber, wherein the first liquid outlet is fluidly connected to the circulation system in such a way to take a liquid from the inside of the hollow housing into the circulation system, and from the circulation system into the cooking chamber.

In an advantageous embodiment, the circulation system comprises a second pump configured for pumping liquid out of the cooking chamber and for pumping such liquid, or a part thereof, again in the cooking chamber.

Preferably, the second valve is positioned between the second pump and the first liquid outlet of the additive drawer.

Preferably, the second pump is configured for being able to completely empty the additive drawer via the first liquid outlet.

In an advantageous embodiment, the cooking oven comprises a control unit configured for controlling the electric and electronic components of the cooking oven.

Advantageously the control unit is configured for determining if the additive drawer is empty.

Preferably, the control unit is configured for determining the emptying status of the additive drawer by measuring the elapsed time from the activation of the first pump.

Preferably, the control unit is configured for determining the emptying status of the additive drawer by measuring the elapsed time from the activation of the second pump.

Preferably, the control unit is configured for determining the emptying status of the additive drawer by measuring the current absorption of the first pump, and more preferably the variations of the current absorption.

Preferably, the control unit is configured for determining the emptying status of the additive drawer by measuring the current absorption of the second pump, and more preferably the variations of the current absorption.

Preferably, the control unit is configured for determining the emptying status of the additive drawer by measuring the rotation speed of the first pump, and more preferably the variations of the rotation speed.

Preferably, the control unit is configured for determining the emptying status of the additive drawer by measuring the rotation speed of the second pump, and more preferably the variations of the rotation speed.

Preferably, the control unit is configured for determining the emptying status of the additive drawer by measuring the measuring the vibration levels of the first pump, for example by means of an accelerometer, and more preferably by threating statistically the vibration levels data.

Preferably, the control unit is configured for determining the emptying status of the additive drawer by measuring the measuring the vibration levels of the second pump, for example by means of an accelerometer, and more preferably by threating statistically the vibration levels data.

In an advantageous embodiment, the second liquid outlet is connected to the steam generator via a second piping system having an outlet into the steam generator.

Preferably, the second piping system comprises a third valve interposed between the second liquid outlet of the additive drawer and the outlet of the second piping system.

BRIEF DESCRIPTION OF DRAWINGS

These and other features and advantages of the invention will be better apparent from the following description of some exemplary and non-limitative embodiments, to be read with reference to the attached drawings, wherein:

FIG. 17 is a longitudinal cross section of a further embodiment of an additive drawer according to the invention;

FIG. 18 is a cross section operated according to line X-X of FIG. 17;

DETAILED DESCRIPTION OF DRAWINGS

Figure 1:
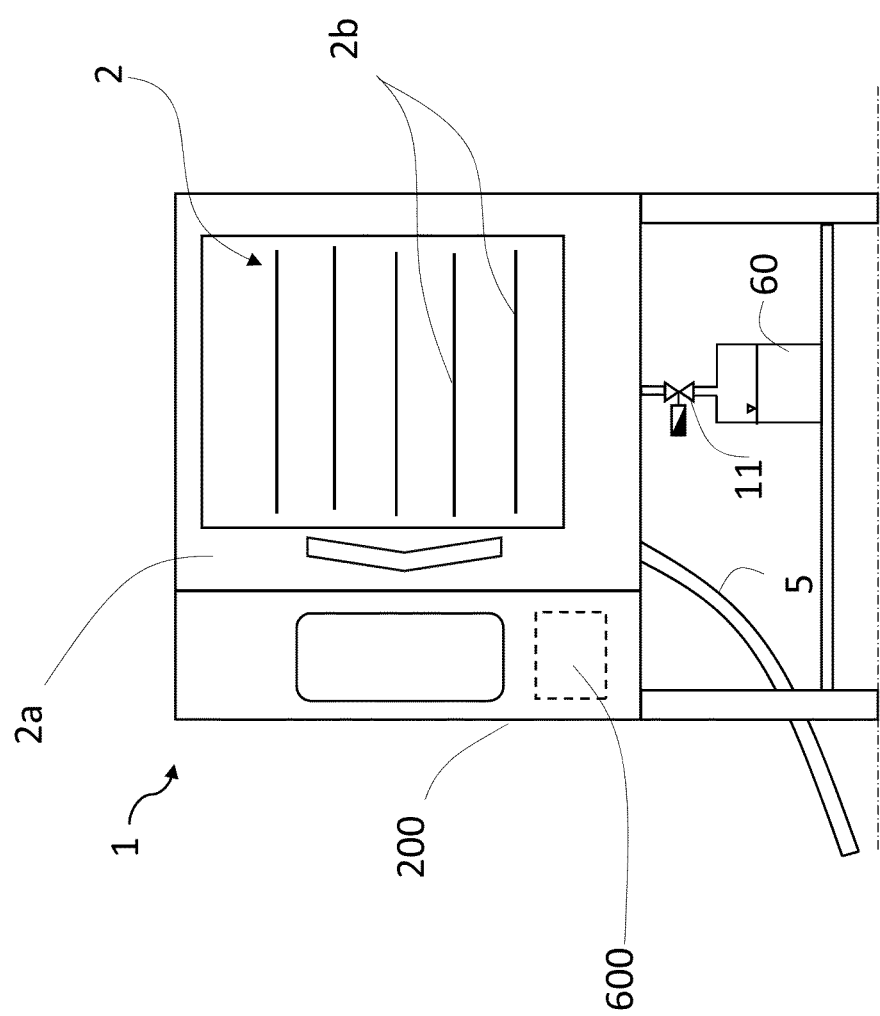
FIG. 1 is a schematic frontal view of an oven according to the invention.

With reference initially to FIG. 1, a cooking oven 1 according to the invention is schematically described.

It is underlined that all the functions of the oven can be advantageously controlled by a suitable electronic controller, for example a programmed/programmable electronic board, schematically illustrated in FIG. 1 by a dashed square 600.

The cooking oven comprises an external casing 200, containing a cooking chamber 2, wherein foodstuffs can be placed for being cooked; preferably, the cooking chamber is accessible via a door 2a.

In an advantageous embodiment, like in the examples of attached figures, the cooking chamber 2 contains a plurality of trays or racks 2b, wherein foodstuff, or pots or trays containing foodstuff, can be placed for being cooked.

The cooking chamber 2 has a bottom wall 3, preferably, but not necessarily, at least partially, basin-shaped, so as to better collect grease dripping from the foodstuffs being cooked.

Advantageously, the bottom wall 3 is provided with a first cooking chamber outlet 4 positioned in such a way to receive grease or liquid dripped from the foodstuff being cooked and collected in the bottom wall 3.

In the advantageous examples illustrated in attached figures, the bottom wall 3 has a region 3a, preferably centrally positioned, which is basin shaped; in this advantageous example, the first cooking chamber outlet 4 is positioned centrally with respect to this basin-shaped region 3a. More preferably, the region 3a is at least partially funnel-shaped, at least at or in proximity to the inlet border 4a of first cooking chamber outlet 4, so as to favour the drain of the grease collected on such a region 3a to the first cooking chamber outlet 4.

Preferably, if the trays or racks 2b are provided, the first cooking chamber outlet 4 is positioned centrally with respect to overlying trays or racks 2b, so as to effectively receive grease dripping from the foodstuff positioned on these trays or racks 2b.

The oven 1 also comprises a grease conduit 6 configured for draining grease from the cooking chamber 2; the first cooking chamber outlet 4 is fluidly connected to the grease conduit 6.

Advantageously, the grease conduit 6 is selectively connected or connectable to a grease container 60, positioned preferably outside the oven 1, and more preferably removable, in such a way that, when full, it can be removed for being emptied, and/or it can be replaced by an empty one.

In an advantageous embodiment, the grease conduit 6 is selectively connected or connectable to the grease container 60 via a first valve 11, that can be selectively opened and closed, automatically and/or manually, in order to allow grease dripping from the foodstuff to be collected in the grease container 60.

In a preferred embodiment, the grease conduit 6 is configured for draining grease exiting the first cooking chamber outlet 4 by gravity.

This can be obtained, for example, by orienting the grease conduit 6 vertically, or substantially vertically, when the cooking oven 1 is in its operative position.

Advantageously, the cooking oven further comprises a heating device 8 configured for heating the internal of the cooking chamber 2; the heating device 8 can be an electrical heater, or (as in the examples illustrated in attached figures) hot tubes wherein the hot fumes exiting a gas burner flows, a heat exchanger, etc.

Advantageously, the cooking oven 1 comprises a perforated suction wall 18 separating the cooking chamber 2 from a heating chamber 19 containing, at least partially, the heating device 8, and, preferably, a fan 20 configured for circulating heated air through the cooking chamber 2 and the heating chamber 19.

The cooking oven 1 comprises a vapour outlet duct 9 configured for discharging vapour from the cooking chamber 2; the vapour outlet duct 9 can advantageously discharge the vapour in the external environment around the cooking oven 1, or it can be advantageously connected to a vapour discharge system, preferably provided in the building where the cooking oven 1 is installed.

Advantageously, the vapour outlet duct 9 comprises a vapour outlet valve 45, for selectively opening/closing the vapour outlet duct 9, so as to regulate the discharge of the vapour in the external environment.

According to the invention, the bottom wall 3 of the cooking chamber 2 is provided with a second cooking chamber outlet 10, distinct from the first cooking chamber outlet 4 and fluidly connected to the vapour outlet duct 9.

Vapour (e.g. a mixture of steam and air/gas) present the cooking chamber 2, for example emitted from the foodstuff, and/or (like in the advantageously embodiments of FIGS. 3 and 4) due to steam supplied in the cooking chamber 2 by a steam supply system 35, if the cooking oven is advantageously provided with such a steam supply system 35, is therefore discharged outside the cooking oven 1 passing through the second cooking chamber outlet 10 and the vapour outlet duct 9.

Preferably, the first cooking chamber outlet 4 and the second cooking chamber outlet 10 are positioned on the bottom wall 3, and are reciprocally positioned and/or arranged, in such a way that the grease collected in the bottom wall 3 enters firstly/more easily the first cooking chamber outlet 4 than the second cooking outlet chamber 10, so that the possibilities that the grease enters the second cooking chamber outlet 10 are highly reduced.

This can be obtained for example, in advantageous embodiments, like in the examples illustrated in attached figures, if the inlet border 10a of the second cooking chamber outlet 10 is placed at a raised position with respect to the inlet border 4a of the first cooking chamber outlet 4; in this way the grease collected in the bottom 3 goes firstly into the first cooking chamber outlet 4, and therefore the possibilities that its level increases enough to enter the first cooking chamber outlet 10 are highly reduced.

Figure 8:
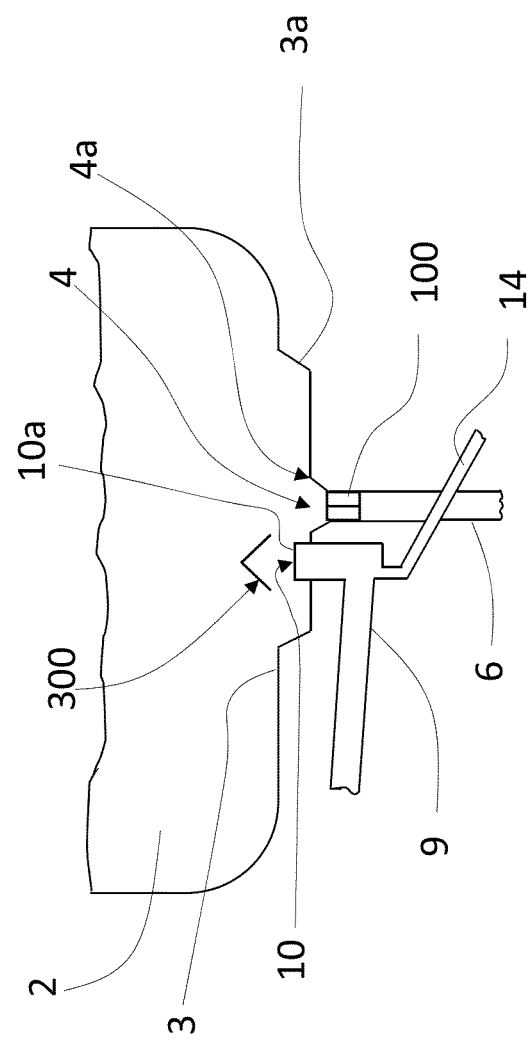
FIG. 8 is a detail of a schematic lateral view the bottom region of the cooking chamber according to a further advantageous embodiment of the invention.

In a further advantageous embodiment, like in the example of FIG. 8, the cooking oven 1 can comprise a shield element 300 for preventing grease in particular grease falling from the overlying foodstuff being cooked, from entering the second cooking chamber outlet 10. Preferably, the shield element 300 is positioned over the second cooking chamber outlet 10, spaced apart from the inlet border 10a of the latter.

More preferably, the said shield element 300 protrudes from the lateral wall of the cooking chamber 2; advantageously the shield element 300 can be fixed to the lateral wall of the cooking chamber for example by welding and or screwing, and or bolts, etc.

In an advantageous embodiment, the shield element 300 can have a convex, preferably reversed V-shaped, cross section, so as to deflect away from the underlying second cooking chamber outlet 10 the grease droplets falling from the foodstuff being cooked.

In the advantageous embodiments illustrated in attached figures, the cooking oven 1 comprises a cleaning system 70, advantageously comprising a circulation system 7 configured for pumping liquid out of the cooking chamber 2 and for pumping such liquid, or a part thereof, again in the cooking chamber 2.

In preferred embodiments, like for example the ones illustrated in attached figures, the circulation system 7 comprises a circulation pump 7a, an aspiration conduit 7b connecting the circulation pump 7a to the first cooking chamber outlet 4 and/or to the second cooking chamber outlet 10, and a delivery conduit 7c connecting the circulation pump 7a to a washing/rinsing liquid circulation outlet 13 provided in the cooking chamber 2 and configured for allowing washing/rinsing liquid to enter the cooking chamber 2.

It is underlined that a washing liquid can be for example water and/or water containing a detergent, while a rinsing liquid can be, for example water and/or water containing a descaling additive or a brightener.

In an advantageous embodiment, like in the examples illustrated in attached figures, the aspiration conduit 7b fluidly connects the circulation pump 7a both to the first cooking chamber outlet 4 and to the second cooking chamber outlet 10.

In an advantageous embodiment, like in the examples illustrated in attached figures, the cooking oven 1 comprises a vortex preventing device 100 positioned at the first cooking chamber outlet 4 and/or in the grease conduit 6, and configured for hindering the formation of vortexes in a stream of liquid exiting the cooking chamber 2 via the first cooking chamber outlet 4.

Advantageously, the vortex preventing device 100 can be an insert having preferably a cross-shaped, or star-shaped cross section, in which a plurality of wings 100a are advantageously defined, preferably form fitted within the first cooking chamber outlet 4; wings 100a partialize the opening of the first cooking chamber outlet 4, hindering the formation of vortexes in the liquid flow exiting the cooking chamber 2 through the first cooking chamber outlet 4.

Absence of vortexes is very important in the advantageous embodiments in which the oven is provided with above described circulation system 7, since vortexes could form bubbles that prevent the circulation pump 7a to prime properly.

In a further embodiment, not illustrated, a vortex preventing device 100 is positioned also at the second cooking chamber outlet 10.

Advantageously, the cooking oven 1 comprises an oven outlet 5, configured for draining liquid outside the cooking oven 1; advantageously the oven outlet 5 can be connected to the sewage pipes, not illustrated, of the building in which the cooking oven 1 is installed.

Preferably, the first cooking chamber outlet 4 is fluidly connected, in addition to the grease conduit 6, also, preferably selectively, to the oven outlet 5.

Advantageously, the oven outlet 5 is provided with an air trap 5a, for preventing, when active (i.e. when filled with a liquid), gas to exit through said oven outlet 5.

In the advantageous embodiment in which the cooking oven 1 is provided with the circulation system 7, as in the examples of attached figures, the first cooking chamber outlet 4 can be fluidly connected to the circulation system 7.

In an advantageous embodiment, as in the examples of attached figures, the second cooking chamber outlet 10 is fluidly connected, in addition to the vapour outlet duct 9, to the oven outlet 5.

Preferably, the first cooking chamber outlet 4 and the second cooking chamber outlet 10 are selectively connected to the oven outlet 5 via a second valve 12, which can be manual or automatic.

Advantageously, the cooking oven 1 comprises a drain conduit 5b fluidly connecting the oven outlet 5 to the first cooking chamber outlet 4 and, preferably, to the second cooking chamber outlet 10.

Advantageously, the drain conduit 5b is fluidly connected to the oven outlet 5 via the second valve 12.

In a preferred embodiment, the second cooking chamber outlet 10 is fluidly connected, in addition to the vapour outlet duct 9, to the grease conduit 6.

In a preferred embodiment, the second cooking chamber outlet 10 is fluidly connected to the grease conduit 6 via a connection duct 50 whose end portion 50a protrudes within the grease conduit 6, substantially perpendicularly to the internal surface of the latter.

This positioning of the end portion 50a hinders the entrance of grease flowing within the grease conduit 6 by gravity into the end portion 50a; in fact, such a grease, flowing in the grease conduit 6, abuts perpendicularly against the external lateral wall of the end portion 50a of the connection duct 50, and it is very difficult that it can enter the end portion 50a which requires a longitudinal entrance.

Preferably, the aspiration conduit 7b of the circulation system 7 is fluidly connected to the second cooking chamber outlet 10 via a by-pass conduit 14 fluidly connecting the aspiration conduit 7b to the vapour outlet duct 9, to which the second cooking chamber outlet 10 is fluidly connected.

More preferably, the by-pass conduit 14 is fluidly connected to the grease conduit 6.

Even more preferably, the by-pass conduit 14 is fluidly connected to the grease conduit 6 via above described connection duct 50.

Advantageously, the aspiration conduit 7b of the circulation system 7 is selectively fluidly connected to the oven outlet 5 via the drain conduit 5b.

Advantageously, the by-pass conduit 14 is selectively fluidly connected to the oven outlet 5 via the drain conduit 5b.

Advantageously, the grease conduit 6 is selectively fluidly connected to the oven outlet 5 via the drain conduit 5b.

In an advantageous embodiment, the cleaning system 70 comprises a washing/rinsing liquid introduction system 16 configured for taking washing/rinsing liquid within the cooking chamber 2.

In an advantageous embodiment, the washing/rinsing liquid introduction system 16 comprises an introduction conduit 16a fluidly connected to the cooking chamber 2 and configured for selectively supplying into the latter washing and/or rinsing liquid.

In a preferred embodiment, the washing/rinsing liquid introduction system 16 comprises a third valve 16b for controlling the supply of washing and/or rinsing liquid through the introduction conduit 16a.

Advantageously, as in the examples illustrated in attached figures, the introduction conduit 16a can be connected, upstream the third valve, to water mains, not illustrated, provided in the building where the cooking oven 1 is installed.

Advantageously, the washing/rinsing liquid circulation outlet 13 and the outlet 16c of the introduction conduit 16a are positioned in an upper wall 23 of the cooking chamber 2.

Preferably, the washing/rinsing liquid circulation outlet 13 and the outlet 16c of the introduction conduit 16a are positioned in an upper wall 23 of the cooking chamber 2, in proximity of the suction wall 18.

Preferably, the outlet 16c of the introduction conduit 16a is separated from the washing/rinsing liquid circulation outlet 3.

In a further advantageous embodiment, not illustrated, the outlet of the introduction conduit 16a into the cooking chamber 2 coincides with the washing/rinsing liquid circulation outlet 13.

Advantageously, the cooking oven 1 comprises a quenching system 17 for cooling down steam exiting from the cooking chamber 2.

Preferably, the quenching system 17 comprises a quenching conduit 17a for supplying a cooling liquid within the vapour outlet duct 9.

The quenching liquid is preferably fresh water, coming from the water mains, not illustrated, of the building in which the cooking oven 1 is installed, to which the quenching conduit 17a can be fluidly connected.

Advantageously, the quenching conduit 17a comprises an inlet 170a positioned, in the operative position of the cooking oven 1, at a higher level with respect to the maximum level 500 that washing/rinsing liquid can reach within the cooking chamber 2 during the washing procedure of the cooking oven 1.

This ensures that, even if washing/rinsing liquid should flow back through the quenching conduit 17a, it wouldn't exit the latter with the risk of contaminating the water mains.

In a preferred embodiment, as in the examples illustrated in attached figures, the vapour outlet duct 9 comprises a bottom region 9a, positioned, in the operative position of the cooking oven 1, at least partially below the cooking chamber 2, and fluidly connected downstream of said second cooking chamber outlet 10.

More preferably, as in the examples of the attached figures, the bottom region 9a of the vapour outlet duct 9 is slightly inclined in such a way that liquid contained therein tends to flow, by gravity, in counter-current with respect to the vapour flowing through the bottom region 9a; in other words, the bottom region 9a is preferably inclined in such a way to define a backwards slope.

In a preferred embodiment, the by-pass conduit 14 is connected to the vapour outlet duct 9 at or in proximity to the initial region of the bottom region 9a so that, due to the slope of the latter, condensed liquid present in such a bottom region 9a flows by gravity into the by-pass conduit 14.

Preferably, the vapour outlet duct 9 comprises an end region 9b protruding upwards from the bottom region 9a, from which vapour is released in the environment.

Advantageously, the end region 9b is substantially vertical.

Preferably, the quenching conduit 17a comprises an outlet 1710b positioned within the bottom region 9a of the vapour outlet duct 9; since in this way quenching liquid is released in the vapour outlet duct quite far away from its end region 9a, this arrangement of the outlet 170b prevents that quenching liquid (e.g. water) exiting the quenching conduit 17a is taken out of the vapour outlet duct 9 by the flow of vapour, schematically illustrated with dotted arrows 400 in attached figures, flowing therein.

Preferably, the outlet 170b of the quenching conduit 17a can comprise a quenching nozzle, not illustrated, arranged within the bottom region 9a and configured for spraying a jet of water against the vapour exiting the cooking chamber outlet 10.

In an advantageous embodiment, the quenching system 17 comprises a fourth valve 17c for controlling the supply of cooling water through the quenching conduit 17a.

Preferably, as in the examples illustrated in attached figures, the cooking oven 1 comprises a ventilation pipe 21 fluidly connected to the cooking chamber 2 and configured for selectively taking air from the external environment into the cooking chamber 2.

Preferably, the ventilation pipe 21 comprises an air inlet 21a provided at the heating chamber 19, more preferably in proximity to the fan 20.

Advantageously, the ventilation pipe 21 is provided with a controlled ventilation valve 22 for selectively closing the ventilation pipe 21.

Preferably, the cooking oven 1 comprises an overflow conduit 26 directly fluidly connecting the vapour outlet duct 9 to the oven outlet 5, and configured for directly discharging to the oven outlet 5 liquid present in the vapour outlet duct 9 only if the level of such a liquid exceeds a certain height. Advantageously, such height corresponds to the maximum level 500 allowed for the liquid within the cooking chamber 2.

Advantageously, like in the examples of attached figures, the circulation system 7 is fluidly connected to the vapour outlet duct 9, and it is configured for taking washing/rinsing liquid from the cooking chamber 2 into the vapour outlet duct 9, so as to wash the latter.

Advantageously, the cleaning system 70 comprises a washing/rinsing additive supplying system 27 configured for supplying washing and/or rinsing additives to the internal of the cooking chamber 2.

In a preferred embodiment, the washing/rinsing additive supplying system 27 comprises an additive drawer 28, loadable with a washing/rinsing additive, and selectively fluidly connected or connectable to the circulation system 7, in such a way to selectively supply a washing and/or rinsing additive into the latter, and preferably to the aspiration conduit 7b and/or delivery conduit 7c.

Preferably, the washing/rinsing additive comprises a descaling additive.

Preferably, the cooking oven 1 comprises a fifth valve 29 for connecting the additive drawer 28 to water supply mains.

Preferably, the cooking oven 1 comprises a sixth valve 30 selectively connecting the additive drawer 28 to the aspiration conduit 7b and/or delivery conduit 7c.

Figure 4:
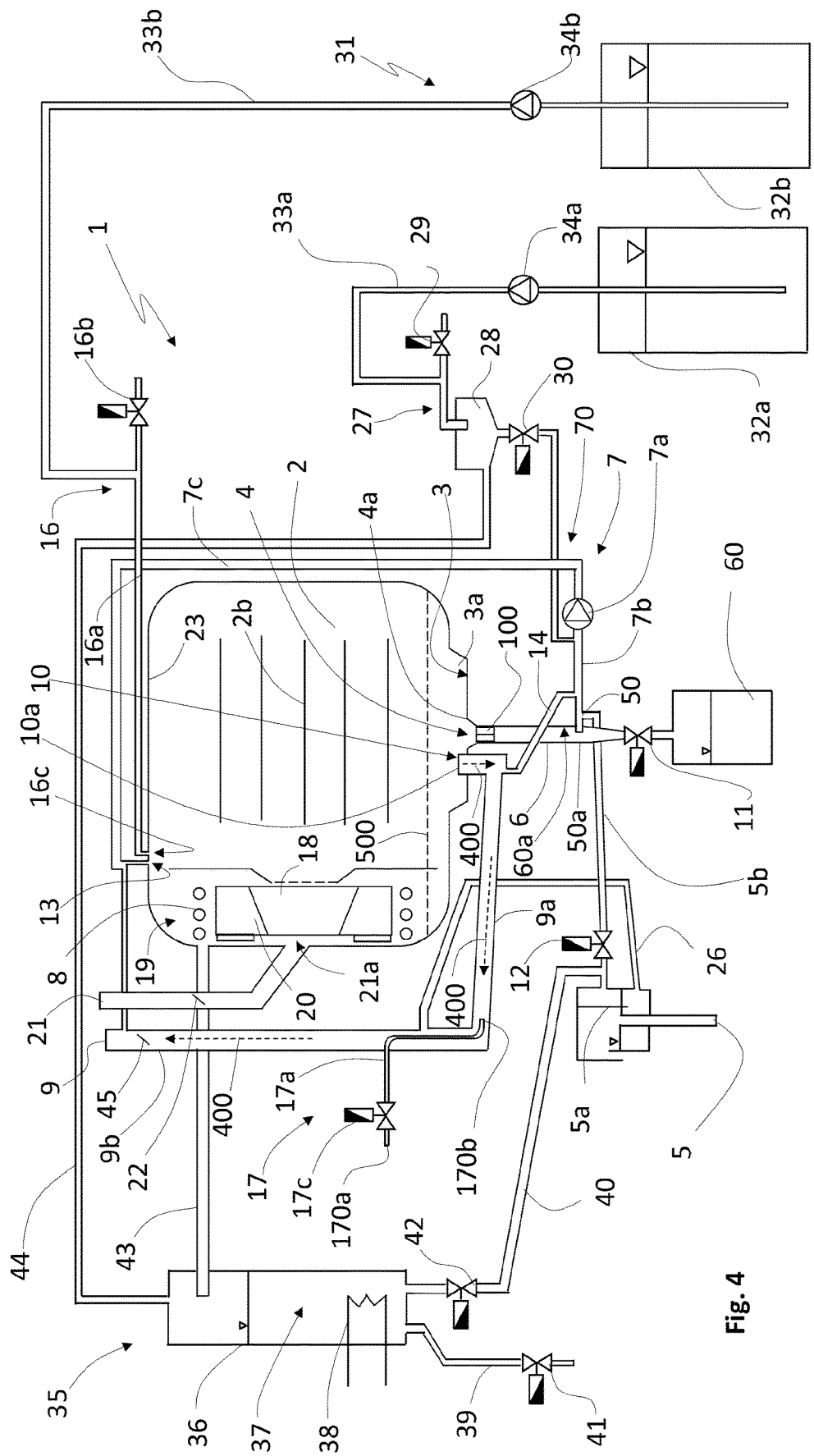
FIG. 4 is a schematic lateral view of a third embodiment of an oven according to the invention, with some parts removed for more clarity.
Figure 5:
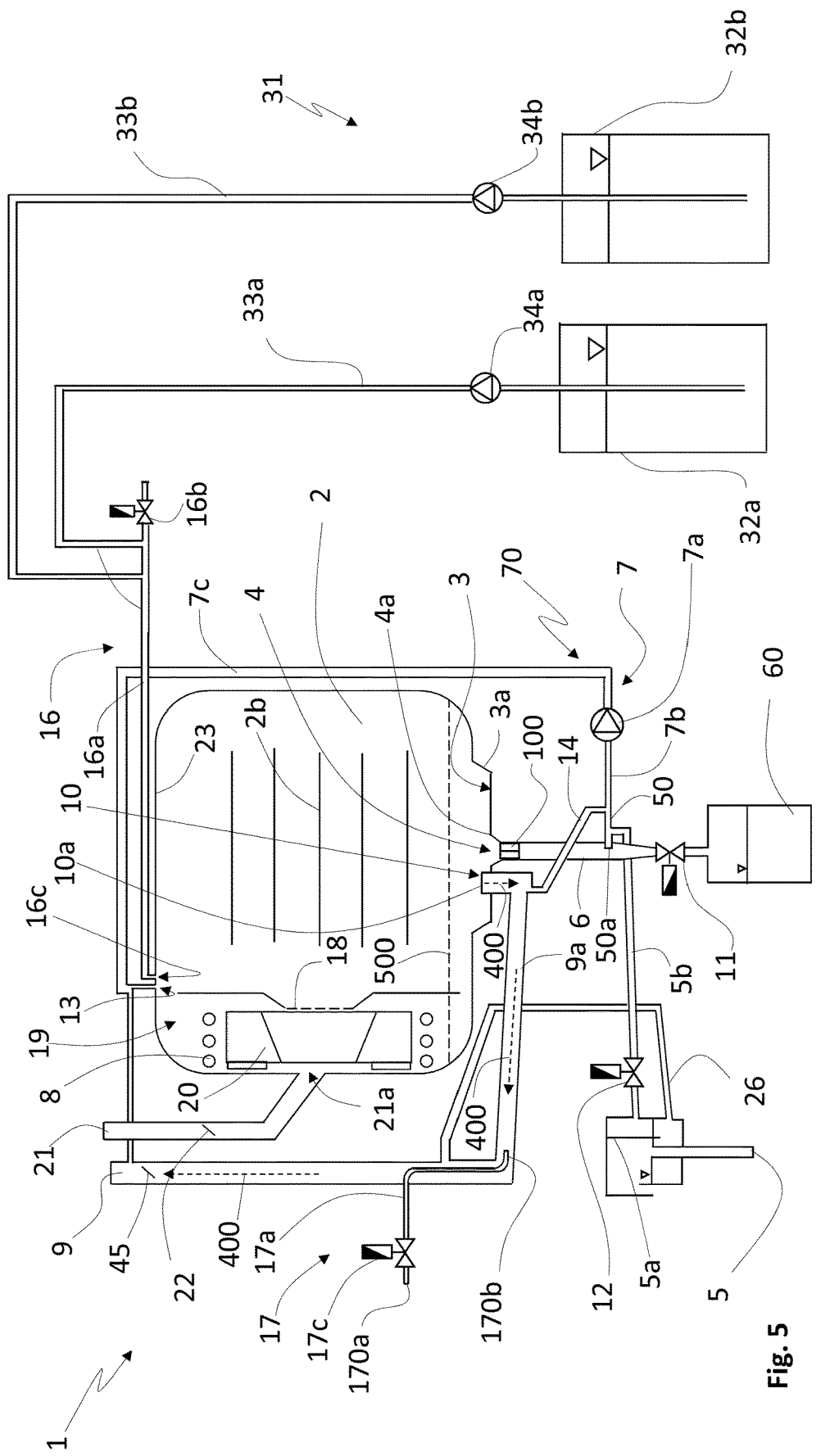
FIG. 5 is a schematic lateral view of a fourth embodiment of an oven according to the invention, with some parts removed for more clarity.
Figure 6:
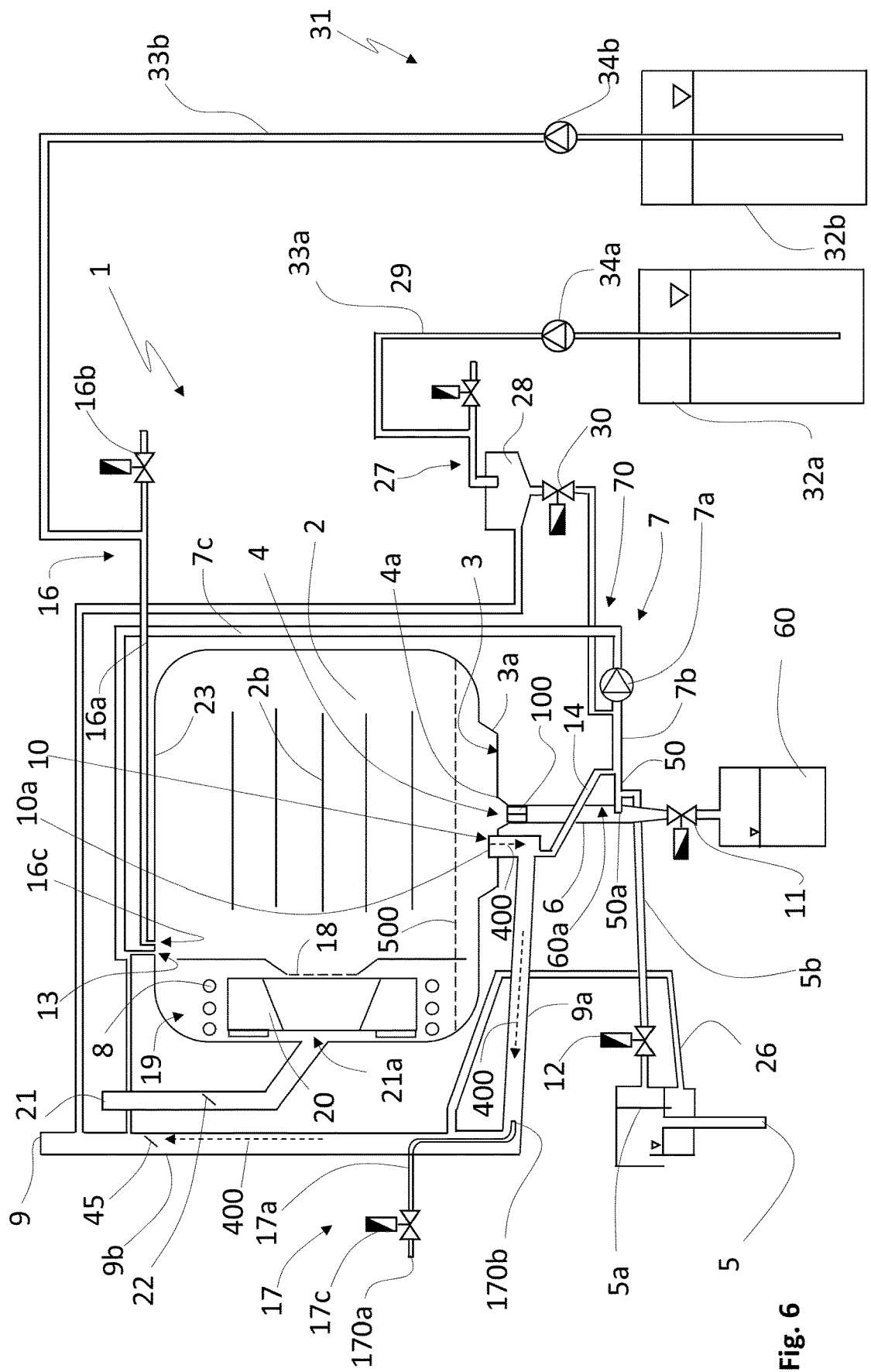
FIG. 6 is a schematic lateral view of a fifth embodiment of an oven according to the invention, with some parts removed for more clarity.
Figure 7:
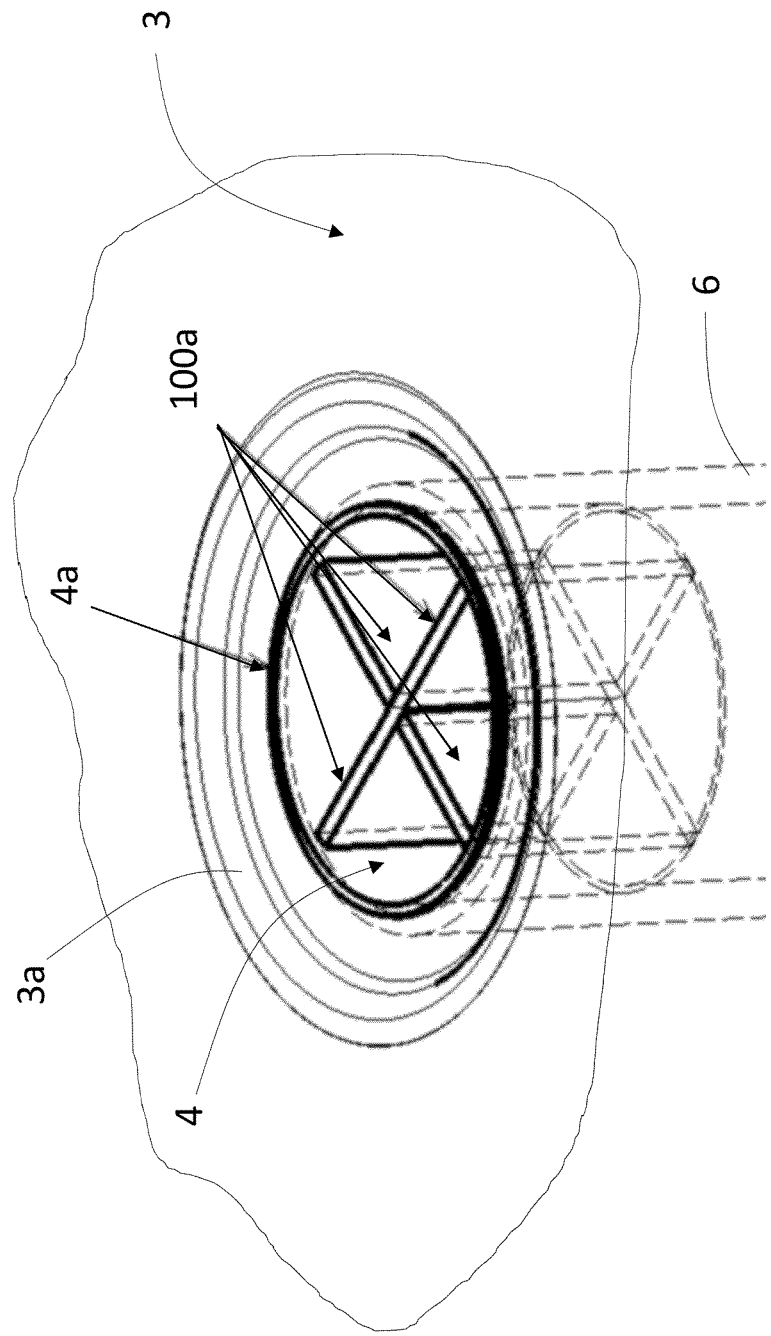
FIG. 7 is a detail of the first cooking chamber outlet according to an advantageous embodiment of the invention, in which a vortex preventing device is visible.

In a further advantageous embodiment, like in the examples illustrated in FIGS. 4 to 6, the cleaning system 70 comprises a washing/rinsing additive multi-dosing system 31 configured for supplying to the internal of the cooking chamber 2 metered amounts of washing and/or rinsing additives.

Preferably, the washing/rinsing additive multi-dosing system 31 comprises:
one or more washing/rinsing additives containers 32a, 32b filled or fillable with an amount of washing and/or rinsing additives sufficient for a plurality of washing/rinsing cycles;

one or more washing/rinsing additives delivery conduits 33a, 33b fluidly connecting such one or more washing/rinsing additives containers 32a, 32b to the internal of the cooking chamber 2;

one or more washing/rinsing additives pumps 34a, 34b, configured for pumping a washing/rinsing additive out of the one or more washing/rinsing additives containers 32a, 32b and for delivering the washing/rinsing additives to the cooking chamber 2 via the one or more washing/rinsing additives delivery conduits 33a, 33b.

In advantageous embodiments, like the ones illustrated in the examples of FIGS. 4 and 6, at least one of the one or more washing/rinsing additives containers 32a, 32bs (for example container 32a in FIGS. 4 and 6) is fluidly connected to the additive drawer 28; in this way, the user can decide if using the cleaning system 70 as a "single dose" cleaning system, i.e. a system requiring to load the drawer 28 any time it has to be used (in this case the user uses the drawer 28 for loading the single dose of additive), or as a "multi-dose" system, i.e. a cleaning system in which the additive(s) have to be filled (or refilled), only sporadically, being enough for a plurality of washing/rinsing procedures.

Preferably, at least one of the one or more washing/rinsing additives containers 32a, 32b is fluidly connected to the washing/rinsing liquid introduction system 16, preferably to the introduction conduit 16a.

In an advantageous embodiment, like for example the one illustrated in FIG. 5, all the washing/rinsing additives containers 32a, 32b are fluidly connected to the introduction conduit 16a; in this case, the drawer 28 is preferably not provided, and the cleaning system 70 can be used only as a "multi-dose" system.

Figure 3:
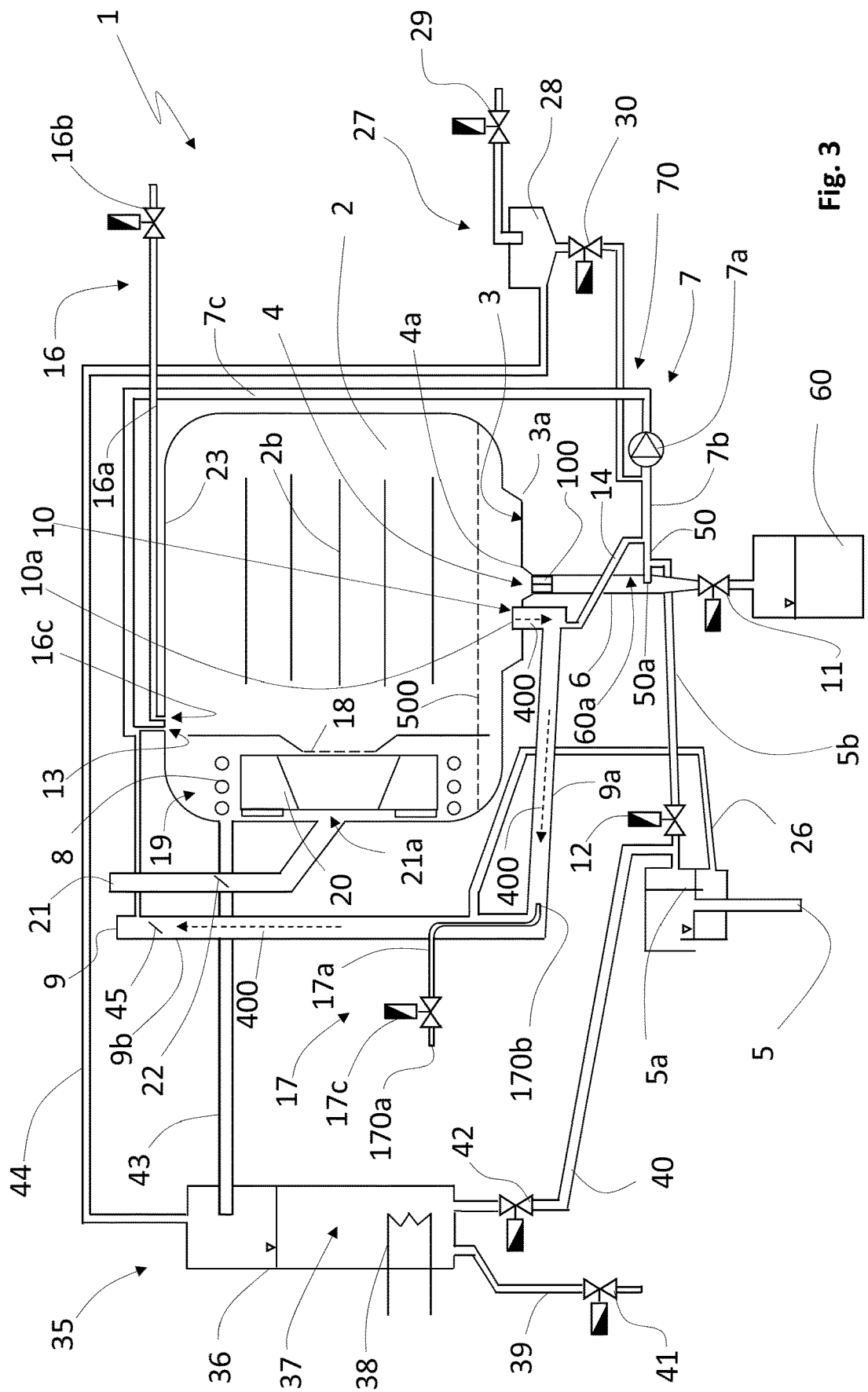
FIG. 3 is a schematic lateral view of a second embodiment of an oven according to the invention, with some parts removed for more clarity.

In advantageous embodiments, like for example the ones illustrated in FIGS. 3 and 4, the cooking oven 1 comprises a steam supply system 35 configured for producing and supplying steam into the cooking chamber 2.

Advantageously the steam supply system 35 can comprise a boiler 36 configured for producing steam and fluidly connected to the cooking chamber 2 so as to release into the latter the steam.

Preferably, the boiler 36 comprises a water reservoir 37 fillable with water, and a water heater 38 for heating water loaded within the water reservoir 37.

Advantageously, the steam supply system 35 comprises:
a water inlet conduit 39 fluidly connected to the water reservoir 37 and connected or connectable to water mains,
a water outlet conduit 40 fluidly connecting the water reservoir 37 to the oven outlet 5.

More preferably, the steam supply system 35 comprises:
a seventh valve 41 associated to the water inlet conduit 39 for controlling the delivery of water to the water reservoir 37,
a eight valve 42 associated to the water outlet conduit 40 for controlling the drain of liquid from the reservoir 37 to the oven outlet 5.

Preferably, the steam supply system 35 comprises a steam duct 43 fluidly connecting the reservoir 37 to the cooking chamber 2, for supplying the steam from the reservoir 37 into the latter.

In advantageous embodiments, like in the examples of FIGS. 3 and 4, the cleaning system 70 is configured for supplying a washing/rinsing liquid to the boiler 36.

In advantageous embodiments, like the ones illustrated in FIGS. 3 and 4, the cleaning system 70 comprises a boiler cleaning conduit 44, fluidly connecting the washing/rinsing additive supplying system 27 to the boiler 36.

Preferably, like in the example of FIGS. 3 and 4, the boiler cleaning conduit 44 fluidly connects the water reservoir 37 to the additive drawer 28.

In an advantageous embodiment, like in the example of FIG. 4, the boiler cleaning conduit 44 fluidly connects the water reservoir 37 to the washing/rinsing additive multi-dosing system 31. In this case, the boiler cleaning conduit 44 can preferably fluidly connect the water reservoir 37 to one or more of the one or more washing/rinsing additives container 32a, 32b.

The functioning of the oven according to the invention will be explained in relation to the different embodiments illustrated in attached figures; it is underlined that FIG. 1 is a schematic illustration of the external shape of a possible embodiment of a cooking oven 1 according to the invention, which fits all the internal layouts illustrated in FIGS. 2 to 6.

Figure 2:
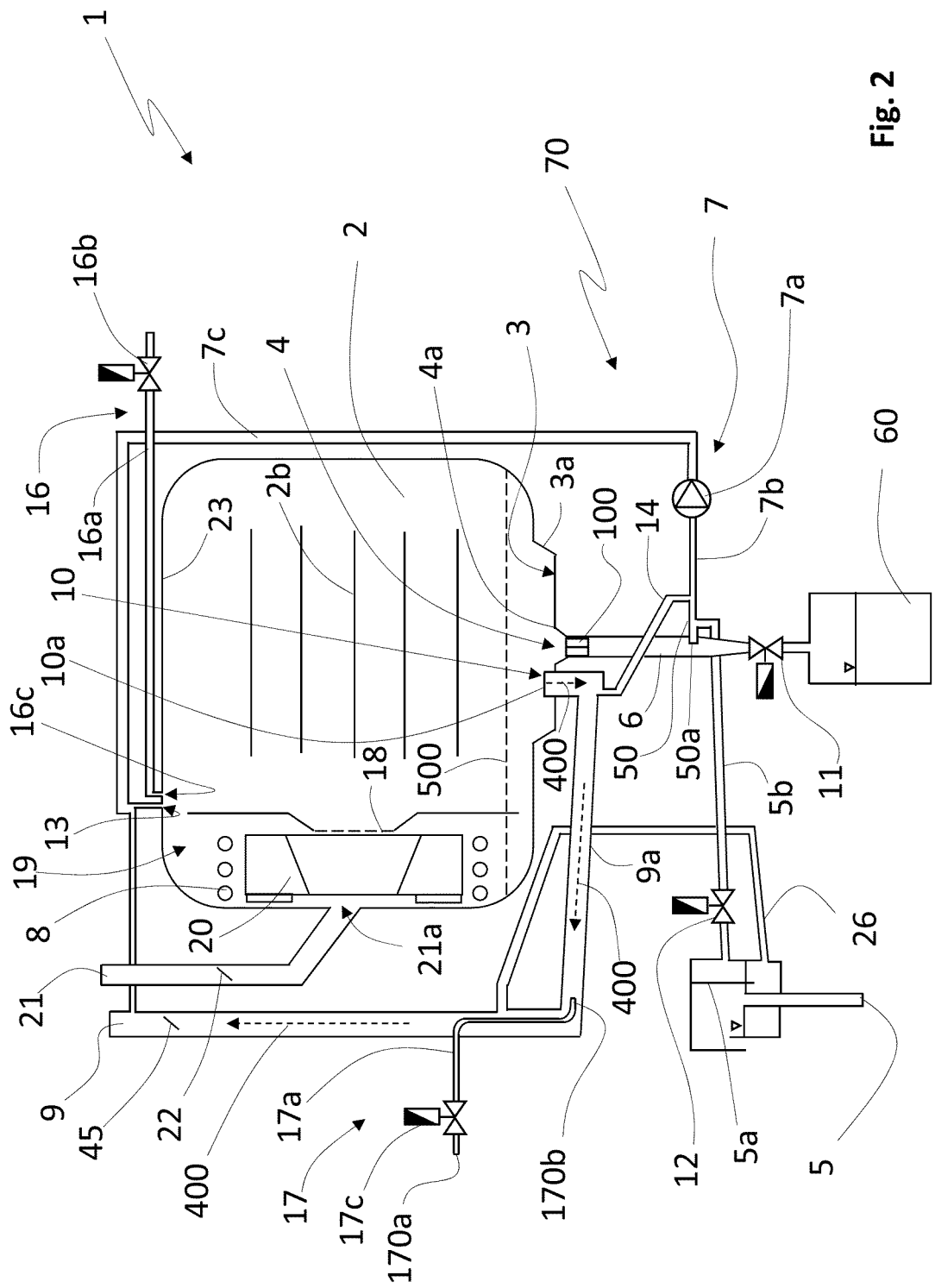
FIG. 2 is a schematic lateral view of a first embodiment of an oven according to the invention, with some parts removed for more clarity.

With reference to the embodiment of FIG. 2, once the foodstuff has been loaded into the cooking chamber 2, and the door 2a closed, the cooking process can be started; the heating device 8 and the fan 20 are operated, advantageously by the electronic controller 600 of the cooking oven 1, according to a specific cooking program selected and/or programmed by a user.

Also ventilation valve 22 is controlled, advantageously by the electronic controller 600 of the cooking oven 1, for keeping fresh air from the external environment into the cooking chamber 2, advantageously according to the specific cooking program selected and/or programmed by the user.

During the cooking process, the vapour present in the cooking chamber 2, and the high internal temperature, increase the internal pressure, and, when the latter exceeds ambient pressure, vapour is expelled to external of the cooking chamber 2 via the second cooking chamber outlet 10 and the vapour outlet duct 9. Vapour outlet valve 45, if present, is controlled, preferably by the electronic controller 600, for selectively controlling the vapour discharge.

The quenching system 17, if provided, emits a jet of preferably fresh clean water, taken more preferably from external water mains, against the flow of vapour 400 flowing through the vapour outlet duct 9, cooling down and dehumidifying such a vapour; condensate resulting from this quenching process is collected in the bottom region 9a of the vapour outlet duct 9, and, preferably due to its slope, it is taken by gravity to the by-pass conduit 14, from which it is taken, still by gravity, to the drain conduit 5b, and to the oven outlet 5, from where it can be drained to the sewage pipes, not illustrated, of the building in which the cooking oven 1 is installed.

Advantageously, before reaching the oven outlet 5, the condensate reaches the air trap 5a (if provided), activating the latter (if not already activated by liquid present in the latter from previous usages of the cooking oven), so that vapour can't exit through it.

If condensate level within the vapour outlet duct 9 exceed the level of the overflow conduit 26, it is drained by the latter directly to the oven outlet 5 (passing through the air trap 5a, if present).

During the cooking process, grease can fall from the overlying foodstuff to the bottom 3 of the cooking chamber 2, and it is collected into the cooking chamber outlet 4 and taken to the grease conduit 6, from which it is collected into the grease container 60.

Having provided two separated cooking chamber outlets, one dedicated to collect grease, reduces the possibility that grease could obstruct the second cooking chamber outlet 10 taking to the vapour outlet duct 9.

In the advantageous embodiment in which the bottom wall 3 of the cooking chamber 2 has a region 3a at least partially funnel-shaped at least at or in proximity to the inlet border 4a of first cooking chamber outlet 4, grease collected on this region 3a is very effectively taken by gravity into the first cooking chamber outlet 4.

In the still more preferred embodiment in which the inlet border 10a of the second cooking chamber outlet 10 is placed at a raised position with respect to the inlet border 4a of the first cooking chamber outlet 4, if the grease collects in the bottom wall 3 of the cooking chamber, it enters firstly the first cooking chamber 4, and it is therefore drained to the grease conduit 6 before reaching the level of the inlet border of the second cooking chamber outlet 10.

In the advantageous embodiment, illustrated for example in FIG. 8, in which the cooking oven 1 comprises a shield element 300 for preventing grease from entering the second cooking chamber outlet 10, such a shield element 300 prevents also grease drops falling from the foodstuff being cooked to directly enter the second cooking chamber outlet 10.

After the end of cooking process, the oven can be cleaned by the cleaning system 70; an automatic or semi-automatic cleaning process can be advantageously activated by the electronic controller 600, which operates on the electrically/electronically operated components of the cleaning system 70.

The automatic or semi-automatic cleaning process advantageously starts with a washing phase, in which, in the embodiment of FIG. 2, after having emptied the cooking chamber 2 and having positioned a detergent, for example in form of a tablet or of powder, in the bottom 3 of the cooking chamber, the door 2a can be closed, and, with the second valve 12 and the first valve 11 closed, third valve 16b can be opened (preferably automatically by the electronic controller 600).

The liquid level within the cooking chamber 2 is preferably detected, for example by a suitable level sensor, not illustrated, present within the cooking chamber 2, and/or by a flowmeter, not illustrated measuring the amount of water entering through the third valve 16b, and communicating this amount to the electronic controller 600, which is configured for calculating the liquid level from the amount of liquid entering through the third valve 16b.

Once the liquid level within the cooking chamber 2 has reached a prefixed value, and/or after a certain time has lapsed, third valve 16b is closed (advantageously automatically by the electronic controller 600).

Then, the circulation pump 7a is operated, so as to circulate the washing liquid (i.e. water mixed with the detergent present in the cooking chamber 2) through the circulation system 7. In particular, the washing liquid is circulated through the first cooking chamber outlet 4, grease conduit 6, connection duct 50, drain conduit 5b, second cooking chamber outlet 10, bottom region 9a and part of the end region 9b of the vapour outlet duct 9, by-pass conduit 14, aspiration duct 7b, delivery duct 7c, circulation outlet 13, cooking chamber 2.

Preferably, during the washing phase, more preferably after all the washing liquid is loaded into the cooking chamber, and before switching on the circulation pump 7a, the heating device 8 is operated, so as to improve the degreasing effect of the washing liquid. More preferably the heating device 8 is operated for keeping the temperature within the cooking chamber at a prefixed temperature (e.g. 140° C.), or within a range of temperatures (e.g. 120-160° C.), to which corresponds a temperature of the water comprised between 70-80° C.

Preferably, during the washing phase, more preferably during activation of circulation pump 7a, the fan 20 is operated, so as to distribute the washing liquid falling from the circulation outlet 13 on all the surfaces internal to the cooking chamber 2.

Advantageously, the vortex preventing device 100 prevents the formation of air bubble that could prevent circulation pump 7a from properly priming.

Once the washing phase is completed (e.g. after a certain time, counted for example by the electronic controller 600 has elapsed from the beginning of this phase), circulation pump 7a is stopped, and the second valve 12 is opened (preferably automatically by the electronic controller 600), so as to drain the washing liquid, advantageously by gravity, through the oven outlet 5.

The automatic or semi-automatic cleaning process advantageously comprises a rinsing phase in which, after closing the second valve 12 (which can be done automatically by the electronic controller 600), third valve 16b is opened again (preferably automatically by the electronic controller 600), so as to take clean water within the cooking chamber 2.

Once the liquid level within the cooking chamber 2 has reached a prefixed value, and/or after a certain time has lapsed, third valve 16b is closed again (advantageously automatically by the electronic controller 600).

Then, preferably, circulation pump 7a is operated, so as to circulate the clean water through the circulation system 7, so as to remove residuals of detergent possibly remained therein.

In particular, the clean water is circulated through the first cooking chamber outlet 4, grease conduit 6, connection duct 50, drain conduit 5b, second cooking chamber outlet 10, bottom region 9a and part of the end region 9b of the vapour outlet duct 9, by-pass conduit 14, aspiration duct 7b, delivery duct 7c, circulation outlet 13, cooking chamber 2.

Once the rinsing phase is completed (e.g. after a certain time, counted for example by the electronic controller 600 has elapsed from the beginning of this phase), circulation pump 7a is stopped, and the second valve 12 is opened (preferably automatically by the electronic controller 600), so as to drain the water, advantageously by gravity, through the oven outlet 5.

One or more further rinsing phases, equal or substantially equal to the one just described, can be performed.

Preferably, during the rinsing phases the fan 20 is activated, so as to better distribute the rinsing liquid/clean water on all the surfaces internal to the cooking chamber 2.

Advantageously, before the last rinsing phase, a descaling phase can be performed, which, in the embodiment of FIG. 2, is advantageously almost equal to a rinsing phase, with the difference that during the descaling phase a descaling additive, for example a descaling powder or tab, can be loaded (e.g. manually) into the cooking chamber 2, so as to generate a descaling liquid (i.e. water and descaling additive), which is circulated by the circulation system 7, so as to descale the surfaces that it contacts.

Preferably, the automatic or semi-automatic cleaning process can comprise, before the washing phase, a soaking phase; preferably, in the soaking phase, with the second valve 12 and the first valve 11 closed, third valve 16b can be opened (preferably automatically by the electronic controller 600), preferably until a prefixed water level is reached within the cooking chamber 2, and/or a prefixed time has lapsed until the third valve 16b has been opened. In the soaking phase, heating device 8 is switched on, so as to heat the water collected in the bottom 3 of the cooking chamber 2; then, after a certain time has lapsed, the second valve 12 is opened, and soaking water is drained via the oven drain 5. Then the washing phase can be performed.

With reference to the embodiment of FIG. 3, the functioning of the cooking oven according to the invention is the following.

Once the foodstuff has been loaded into the cooking chamber 2, and the door 2a closed, the cooking process can be started; the heating device 8 and the fan 20 are operated, advantageously by the electronic controller 600 of the cooking oven 1, according to a specific cooking program selected and/or programmed by a user.

Also ventilation valve 22 is controlled, advantageously by the electronic controller 600 of the cooking oven 1, for keeping fresh air from the external environment into the cooking chamber 2, advantageously according to the specific cooking program selected and/or programmed by the user.

During the cooking process, the steam supply system 35 can be operated, preferably by the electronic controller 600, according to the specific cooking program selected and/or programmed by a user, in order to take a prefixed steam amount into the cooking chamber 2. In particular, after water is loaded into the water reservoir 37 via the seventh valve 41, water heater 38 can be operated in order to heat such water and generate steam, which is taken into the cooking chamber 2 via the steam duct 43.

During the cooking process, the vapour present in the cooking chamber 2, the steam supplied by the steam supply system 35 (if present) and the high internal temperature, increase the internal pressure, and, when the latter exceeds ambient pressure, vapour is expelled to external of the cooking chamber 2 via the second cooking chamber outlet 10 and the vapour outlet duct 9. Vapour outlet valve 45, if present, is controlled, preferably by the electronic controller 600, for selectively controlling the vapour discharge.

The quenching system 17, if provided, emits a jet of preferably fresh clean water, taken more preferably from external water mains, against the flow of vapour 400 flowing through the vapour outlet duct 9, cooling down and dehumidifying such a vapour; condensate resulting from this quenching process is collected in the bottom region 9a of the vapour outlet duct 9, and, preferably due to its slope, it is taken by gravity to the by-pass conduit 14, from which it is taken, still by gravity, to the drain conduit 5b, and to the oven outlet 5, from where it can be drained to the sewage pipes, not illustrated, of the building in which the cooking oven 1 is installed.

Advantageously, before reaching the oven outlet 5, the condensate reaches the air trap 5a (if provided), activating the latter (if not already activated by liquid present from previous usages of the cooking oven), so that vapour can't exit through it.

If condensate level within the vapour outlet duct 9 exceeds the level of the overflow conduit 26, it is drained by the latter directly to the oven outlet 5 (passing through the air trap 5a, if present).

During the cooking process, grease can fall from the overlying foodstuff to the bottom 3 of the cooking chamber 2, and it is collected into the cooking chamber outlet 4 and taken to the grease conduit 6, from which it is collected into the grease container 60.

Having provided two separated cooking chamber outlets, one dedicated to collect grease, reduces the possibility that grease could obstruct the second cooking chamber outlet 10 taking to the vapour outlet duct 9.

In the advantageous embodiment in which the bottom wall 3 of the cooking chamber 2 has a region 3a at least partially funnel-shaped at least at or in proximity to the inlet border 4a of first cooking chamber outlet 4, grease collected on this region 3a is very effectively taken by gravity into the first cooking chamber outlet 4.

In the still more preferred embodiment in which the inlet border 10a of the second cooking chamber outlet 10 is placed at a raised position with respect to the inlet border 4a of the first cooking chamber outlet 4, if the grease collects in the bottom wall 3 of the cooking chamber, it enters firstly the first cooking chamber 4, and it is therefore drained to the grease conduit 6 before reaching the level of the second cooking chamber outlet 10.

In the advantageous embodiment, illustrated for example in FIG. 8, in which the cooking oven 1 comprises a shield element 300 for preventing grease from entering the second cooking chamber outlet 10, such a shield element 300 prevents also grease droplets falling from the foodstuff being cooked to directly enter the second cooking chamber outlet 10.

After the cooking process, the oven can be cleaned by the cleaning system 70; an automatic or semi-automatic cleaning process can be advantageously activated by the electronic controller 600, which operates on the electrically/electronically operated components of the cleaning system 70.

In the advantageous embodiment of FIG. 3, the automatic or semi-automatic cleaning process advantageously comprises a steam supply system descaling phase, in which the water reservoir 37 of the steam supply system 35 is preferably emptied by opening the eight valve 42, and a descaling additive is loaded in the additive drawer 28.

Then, with seventh valve 41, eight valve 42, and sixth valve 30 closed, the fifth valve 29 is opened (preferably automatically by the electronic controller 600), so that clean water enters the additive drawer 28, dissolves, preferably only partially, the descaling additive contained therein, forming a descaling solution (i.e. water and descaling additive) which is taken, due to the pressure of the water in the water mains, into the water reservoir 37 through the boiler cleaning duct 44.

Preferably, the water reservoir is only partially filled with the descaling solution coming from the drawer 28, since a part of the descaling additive should preferably remain in the additive drawer for being used in a further step of the automatic or semi-automatic cleaning process.

Advantageously the amount of water loaded into the water reservoir is controlled by a flowmeter, not illustrated, provided at or in series with the fifth valve 29, and preferably controlled by the electronic controller 600 in such a way to close the valve after a prefixed amount of water has flown into the additive drawer 28.

The electronic controller 600 is also preferably configured in such a way that, in addition or in alternative to the flowmeter, a time-based control of the opening of the fifth valve 29 is performed; in other words, the valve is closed after a certain prefixed time has lapsed until its opening.

More preferably, some further water is loaded into the water reservoir 37 by opening (preferably automatically by the electronic controller 600) the seventh valve 41, until a prefixed level within the reservoir 37 is reached, and/or a prefixed time has lapsed until the opening of such seventh valve 41. In this way a prefixed concentration of descaling additive in the descaling solution contained in the water reservoir is obtained. Then the seventh valve 41 is closed.

Advantageously, the water heater 38 is switched on (preferably automatically by the electronic controller 600), so as to increase the descaling effect.

Preferably, the water heater 38 is controlled, preferably by the electronic controller 600, in order to keep a prefixed temperature within the reservoir 37, for example 80° C.; preferably the temperature is measured by a temperature sensor, not illustrated, provided in the water reservoir 37.

Preferably, the descaling solution is kept into the water reservoir 37 for a prefixed time, more preferably one hour and a half. Preferably, this time can be regulated by the user, for example operating on a user interface of the cooking oven 1.

With reference to the advantageous embodiment of FIG. 3, the automatic or semi-automatic cleaning process comprises also a washing phase in which, after having emptied the cooking chamber 2 a detergent, for example in form of a tablet or of powder, is placed in the bottom 3 of the cooking chamber, and the door 2a can be closed.

It is underlined that the steam supply system descaling phase and the above-mentioned washing phase can start contemporaneously, or one can start before the other.

Advantageously, in the washing phase, preferably while the water reservoir 37 is being descaled, or before or after this phase, with the second valve 12 and the first valve 11 closed, third valve 16b can be opened (preferably automatically by the electronic controller 600).

The liquid level within the cooking chamber 2 is preferably detected, for example by a suitable level sensor, not illustrated, present within the cooking chamber 2, and/or by a flowmeter, not illustrated measuring the amount of water entering through the third valve 16b, and communicating this amount to the electronic controller 600, which is configured for calculating the liquid level from the amount of liquid entering through the third valve 16b.

Once the liquid level within the cooking chamber 2 has reached a prefixed value, and/or after a certain time has lapsed, third valve 16b is closed (advantageously automatically by the electronic controller 600).

The, circulation pump 7a is operated, so as to circulate the washing liquid (i.e. water mixed with the detergent present in the cooking chamber 2) through the circulation system 7.

In particular, the washing liquid is circulated through the first cooking chamber outlet 4, grease conduit 6, connection duct 50, drain conduit 5b, second cooking chamber outlet 10, bottom region 9a and part of the end region 9b of the vapour outlet duct 9, by-pass conduit 14, aspiration duct 7b, delivery duct 7c, circulation outlet 13, cooking chamber 2.

Preferably, during the washing phase, more preferably after all the washing liquid is loaded into the cooking chamber 2, and before switching on the circulation pump 7a, the heating device 8 is operated, so as to improve the degreasing effect of the washing liquid. More preferably the heating device 8 is operated for keeping the temperature within the cooking chamber at a prefixed temperature (e.g. 140° C.), or within a range of temperatures (e.g. 120-160° C.), to which corresponds a temperature of the water comprised between 70-80° C.

Preferably, during the washing phase, more preferably while the circulation pump 7a is operated, the fan 20 is operated, so as to distribute the washing liquid falling from the circulation outlet 13 on all the surfaces internal to the cooking chamber 2.

Advantageously, the vortex preventing device 100 prevents the formation of air bubble that could prevent circulation pump 7a from properly priming.

Once the washing phase is completed (e.g. after a certain time, counted for example by the electronic controller 600 has elapsed from the beginning of this phase), circulation pump 7a is stopped, and the second valve 12 is opened (preferably automatically by the electronic controller 600), so as to drain the washing liquid, advantageously by gravity, through the oven outlet 5.

The automatic or semi-automatic cleaning process advantageously comprises a rinsing phase in which, after closing the second valve 12 (which can be done automatically by the electronic controller 600), third valve 16b is opened again (preferably automatically by the electronic controller 600), so as to take clean water within the cooking chamber 2.

Once the liquid level within the cooking chamber 2 has reached a prefixed value, and/or after a certain time has lapsed, third valve 16b is closed again (advantageously automatically by the electronic controller 600).

Then, preferably, circulation pump 7a is operated, so as to circulate the clean water through the circulation system 7, so as to remove residuals of detergent possibly remained therein.

In particular, the clean water is circulated through the first cooking chamber outlet 4, grease conduit 6, connection duct 50, drain conduit 5b, second cooking chamber outlet 10, bottom region 9a and part of the end region 9b of the vapour outlet duct 9, by-pass conduit 14, aspiration duct 7b, delivery duct 7c, circulation outlet 13, cooking chamber 2.

Once the rinsing phase is completed (e.g. after a certain time, counted for example by the electronic controller 600 has elapsed from the beginning of this phase), circulation pump 7a is stopped, and the second valve 12 is opened (preferably automatically by the electronic controller 600), so as to drain the water, advantageously by gravity, through the oven outlet 5.

Preferably, during the rinsing phases the fan 20 is activated, so as to better distribute the rinsing liquid/clean water on all the surfaces internal to the cooking chamber 2.

One or more further rinsing phases, equal or substantially equal to the one just described, can be performed.

After one or more rinsing phases, a descaling phase is advantageously performed.

In the embodiment of FIG. 3, preferably, in the descaling phase, with first valve 11 and second valve 12 closed, and sixth valve 30 opened, fifth valve 29 is opened (preferably automatically by the electronic controller 600), so that clean water enters the additive drawer 28, dissolves, preferably completely, the descaling additive contained therein, forming a descaling solution (i.e. water and descaling additive), and goes by gravity through sixth valve 30, to the aspiration conduit 7b.

Advantageously the amount of water loaded into the water reservoir is controlled by a flowmeter, not illustrated, provided at or in series with the fifth valve 29, and preferably controlled by the electronic controller 600 in such a way to close the valve after a prefixed amount of water has flown into the additive drawer 28.

The electronic controller 600 is also preferably configured in such a way that, in addition or in alternative to the flowmeter, a time-based control of the opening of the fifth valve 29 is performed; in other words, the valve is closed after a certain prefixed time has lapsed until its opening.

In the descaling phase, circulation pump 7a is advantageously operated, so as to circulate the descaling liquid (i.e.

water mixed with the descaling additive present in the additive drawer 28) through the circulation system 7.

In particular, the descaling liquid is circulated through the first cooking chamber outlet 4, grease conduit 6, connection duct 50, drain conduit 5b, second cooking chamber outlet 10, bottom region 9a and part of the end region 9b of the vapour outlet duct 9, by-pass conduit 14, aspiration duct 7b, delivery duct 7c, circulation outlet 13, cooking chamber 2.

Preferably, during the descaling phase, the heating device 8 is operated, so as to improve the descaling effect of the descaling liquid.

Preferably, during the descaling phase, the fan 20 is operated, so as to distribute the descaling liquid falling from the circulation outlet 13 on all the surfaces internal to the cooking chamber 2.

Once the descaling phase is completed (e.g. after a certain time, counted for example by the electronic controller 600 has elapsed from the beginning of this phase), circulation pump 7a is stopped, and the second valve 12 is opened (preferably automatically by the electronic controller 600), so as to drain the descaling liquid, advantageously by gravity, through the oven outlet 5.

Preferably, but not necessarily, at the same time with the completion of the descaling phase, the steam supply system descaling phase can be completed; in this case, preferably automatically by the electronic controller 600, water heater 38 is switched off, eight valve 42 is opened, and the descaling solution present in the water reservoir 37 drained, advantageously by gravity, through the oven outlet 5.

Finally, a further rinsing phase, equal to the ones described above, can be performed, so as to remove possible residuals of descaling solution from the internal of the oven.

In addition, the automatic or semi-automatic cleaning process advantageously comprises a steam supply system rinsing phase, comprising closing the eight valve 42 and opening the seventh valve 41 for a prefixed time, and/or until a prefixed water level is reached within the water reservoir, so as to load clean water within the water reservoir 37, and finally, after a prefixed time has lapsed, opening the eight valve 42, so as to drain, by gravity, rinsing water via the oven outlet 5.

Preferably, the automatic or semi-automatic cleaning process can comprise, before the washing phase, a soaking phase; preferably, in the soaking phase, with the second valve 12 and the first valve 11 closed, third valve 16b can be opened (preferably automatically by the electronic controller 600), preferably until a prefixed water level is reached within the cooking chamber 2, and/or a prefixed time has lapsed until the third valve 16b has been opened. In the soaking phase, heating device 8 is switched on, so as to heat the water collected in the bottom 3 of the cooking chamber 2; then, after a certain time has lapsed, the second valve 12 is opened, and soaking water is drained via the oven drain 5. Then the washing phase can be performed.

With reference to the embodiment of FIG. 4, its functioning differs from the above described functioning of the embodiment of FIG. 3 only because:
   during the washing phase of the automatic or semi-automatic cleaning process, the detergent is not placed in the bottom 3 of the cooking chamber by the user, but it is taken directly into the introduction system 16, preferably into the introduction conduit 16a, by operating additive pump 34b, in such a way to pump the washing additive out of the additive container 32b and pump the washing additive in the introduction system 16;
   during the steam supply system descaling phase, and during the descaling phase, preferably, the descaling additive is not manually loaded into the additive drawer 28, but it is loaded into the additive drawer by operating additive pump 34a, in such a way to pump the descaling additive out of the additive container 32a and to pump the descaling additive in the additive drawer 28.

In the embodiment of FIG. 4, during the automatic or semi-automatic cleaning process, the amount of descaling additive supplied to the additive drawer 28 can be advantageously controlled by operating the additive pump 34a for a prefixed time, and/or by measuring the amount of liquid flowing through additive delivery conduit 33a, for example by a flowmeter, not illustrated.

In the embodiment of FIG. 4, during the automatic or semi-automatic cleaning process, the amount of washing agent supplied to the introduction system 16 is controlled by operating the additive pump 34b for a prefixed time, and/or by measuring the amount of liquid flowing through additive delivery conduit 33b, for example by a flowmeter, not illustrated.

It is underlined that the embodiment of FIG. 4 allows loading also manually an additive into the additive drawer 28 (for example if the additive container 32a is empty, and/or for adding a further kind of additive in addition to the one contained in additive container 32a). With reference to the embodiment of FIG. 5, its functioning differs from the above described functioning of the embodiment of FIG. 1 only because:
   during the washing phase of the automatic or semi-automatic cleaning process, the detergent is not placed in the bottom 3 of the cooking chamber by the user, but it is taken directly into the introduction system 16, preferably into the introduction conduit 16a, by operating additive pump 34b, in such a way to pump the washing additive out of the additive container 32b and pump the washing additive in the introduction system 16, from which it is taken, together with the water entering the third valve 16b, into the cooking chamber 2;
   during the descaling phase, the descaling additive is not manually loaded into the cooking chamber 2, but it is loaded into the introduction system by operating additive pump 34a, in such a way to pump the descaling additive out of the additive container 32a and to pump the washing additive in the introduction system 16, from which it is taken, together with the water entering the third valve 16b, into the cooking chamber 2.

In the embodiment of FIG. 5, during the automatic or semi-automatic cleaning process, the amount of descaling additive supplied to introduction system 16 can be advantageously controlled by operating the additive pump 34a for a prefixed time, and/or by measuring the amount of liquid flowing through additive delivery conduit 33a, for example by a flowmeter, not illustrated.

In the embodiment of FIG. 5, during the automatic or semi-automatic cleaning process, the amount of washing agent supplied to the introduction system 16 is controlled by operating the additive pump 34b for a prefixed time, and/or by measuring the amount of liquid flowing through additive delivery conduit 33b, for example by a flowmeter, not illustrated.

With reference to the embodiment of FIG. 6, its functioning differs from the above described functioning of the embodiment of FIG. 1 only because:
   during the washing phase of the automatic or semi-automatic cleaning process, the detergent is not placed in the bottom 3 of the cooking chamber by the user, but it is taken directly into the introduction system 16, preferably into the introduction conduit 16a, by operating additive pump 34b, in such a way to pump the washing additive out of the additive container 32b and pump the washing additive in the introduction system 16, from which it is taken, together with the water entering the third valve 16b, into the cooking chamber 2;

during the descaling phase, preferably, the descaling additive is not manually loaded into the cooking chamber 2, but is loaded into the additive drawer 28 by operating additive pump 34a, in such a way to pump the descaling additive out of the additive container 32a and to pump the descaling additive in the additive drawer 28.

In the embodiment of FIG. 6, during the automatic or semi-automatic cleaning process, the amount of descaling additive supplied to the additive drawer 28 can be advantageously controlled by operating the additive pump 34a for a prefixed time, and/or by measuring the amount of liquid flowing through additive delivery conduit 33a, for example by a flowmeter, not illustrated.

In the embodiment of FIG. 6, during the automatic or semi-automatic cleaning process, the amount of washing agent supplied to the introduction system 16 is controlled by operating the additive pump 34b for a prefixed time, and/or by measuring the amount of liquid flowing through additive delivery conduit 33b, for example by a flowmeter, not illustrated.

It is underlined that the embodiment of FIG. 6 allows loading also manually an additive into the additive drawer 28 (for example if the additive container 32a is empty, and/or for adding a further kind of additive in addition to the one contained in additive container 32a).

It is seen therefore how the invention achieves the proposed aim and objects, there being provided a cooking oven which, thanks to two distinct cooking chamber outlets, one taking to the grease conduit, and the other to the vapour outlet duct, the risk that grease dripping from the foodstuff and collected in the bottom wall of the cooking chamber can obstruct or clog the vapour outlet duct, and the related above mentioned problems, is highly reduced.

In addition, the two cooking chamber outlets are positioned in a region of the cooking chamber, i.e. its bottom wall, in which they don't hinder the circulation of air within the cooking chamber, and therefore they don't affect, or only marginally affect, the thermal uniformity within the cooking chamber.

The advantageous embodiment in which the first cooking chamber outlet and the second cooking chamber outlet and are reciprocally arranged in such a way that the grease collected in the bottom wall of the cooking chamber enters firstly/more easily the first cooking chamber outlet, ensures that at most a very small amount of grease could enter the second cooking chamber outlet. As explained, this can be obtained, for example, by positioning the inlet border of first cooking chamber outlet at a funnel-shaped region of the bottom wall and/or placing the inlet border of the second cooking chamber outlet at a raised position with respect to the inlet border of the first cooking chamber outlet.

Figure 9:
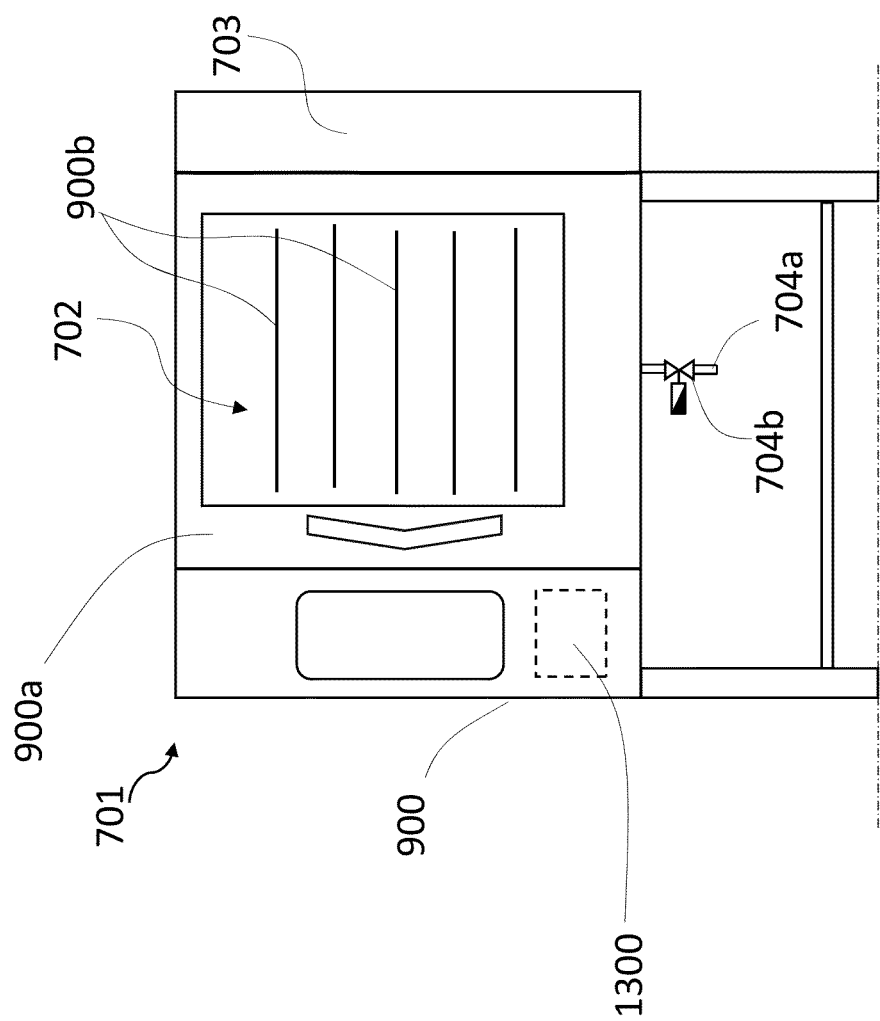
FIG. 9 is a schematic frontal view of an oven according to the invention.

With reference now to FIG. 9 and onwards, a cooking oven 701 according to the invention is schematically described.

The cooking oven 701 advantageously comprises an external casing 900, containing a cooking chamber 702, wherein foodstuffs can be placed for being cooked; preferably, the cooking chamber is accessible via a door 900a.

In an advantageous embodiment, like in the examples of attached figures, the cooking chamber 702 contains a plurality of trays or racks 900b, wherein foodstuff, or pots or trays containing foodstuff, can be placed for being cooked.

Figure 19:
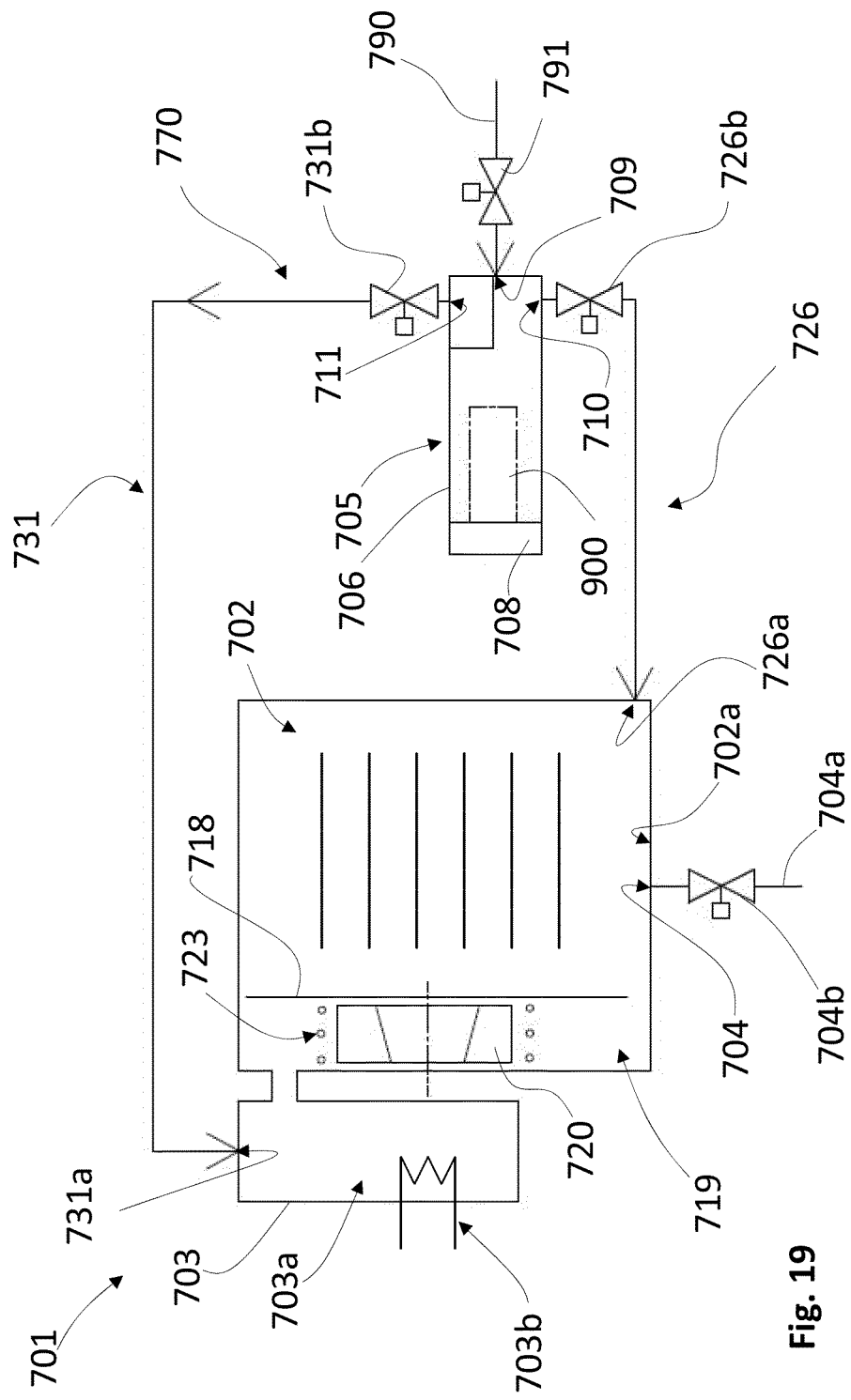
FIG. 19 is a schematic lateral view, with some parts removed for clarity, of an exemplary embodiment of a cooking oven according to the invention.
Figure 20:
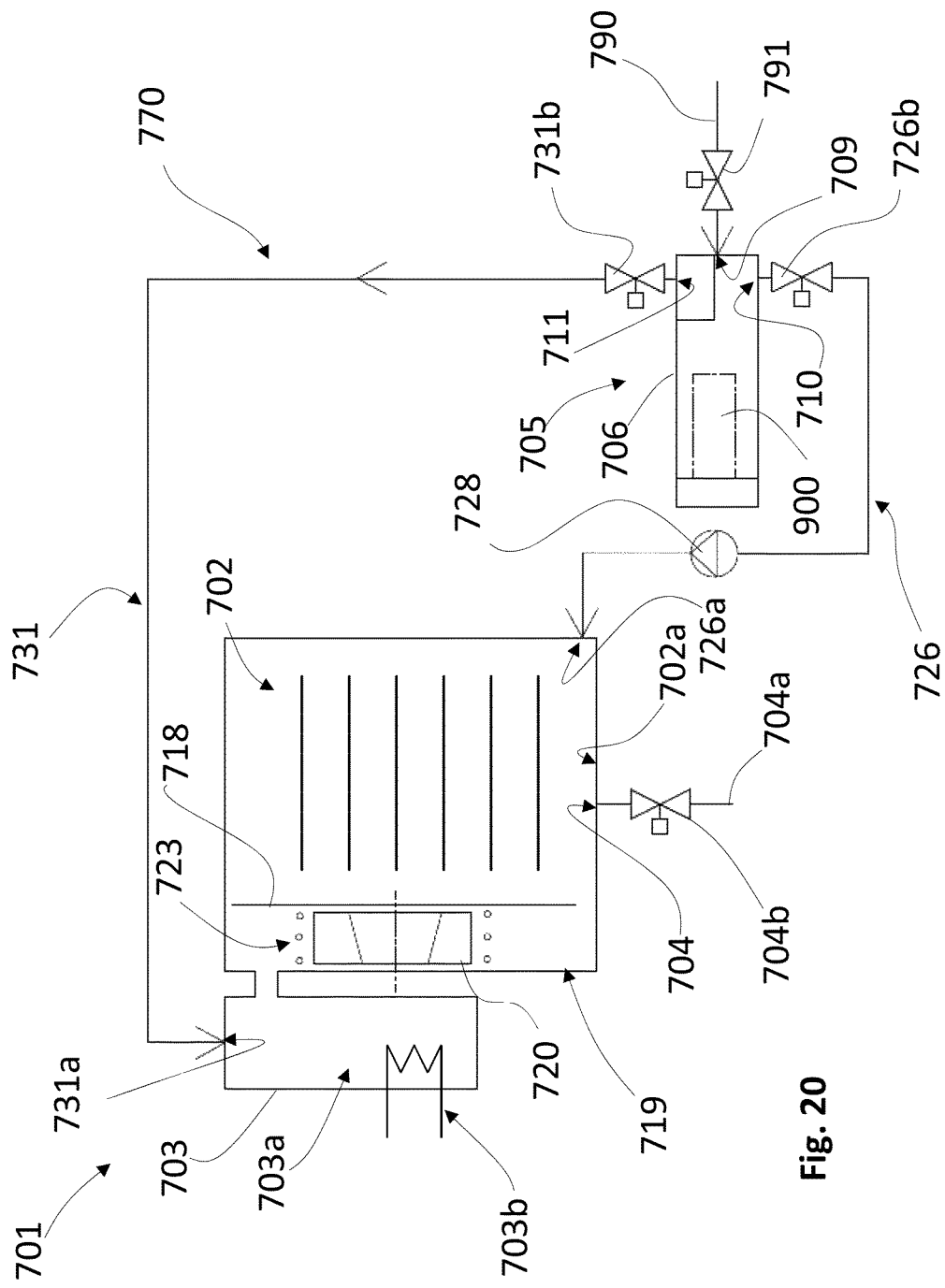
FIG. 20 is a schematic lateral view, with some parts removed for clarity, of an exemplary embodiment of a cooking oven according to the invention.
Figure 21:
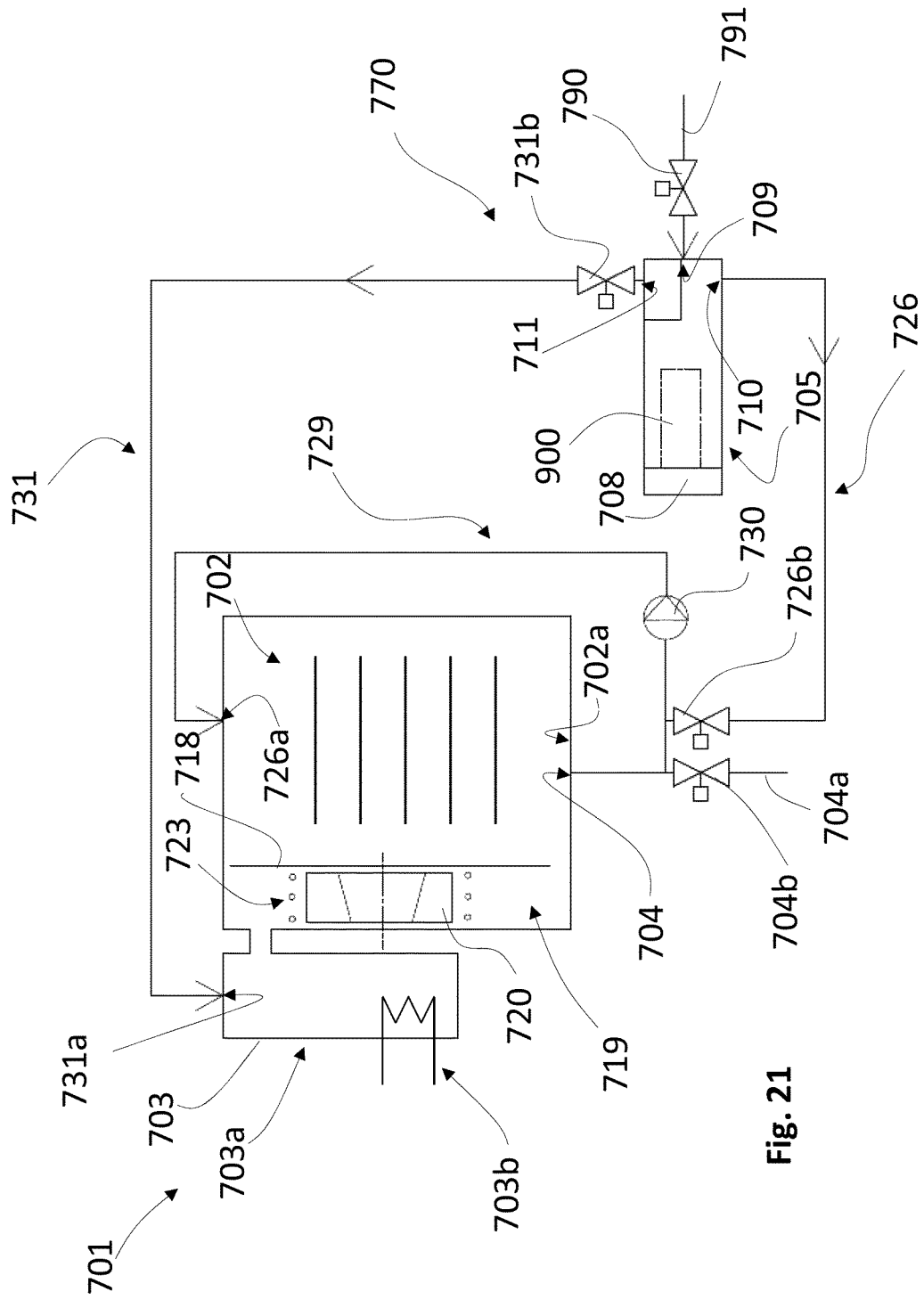
FIG. 21 is a schematic lateral view, with some parts removed for clarity, of an exemplary embodiment of a cooking oven according to the invention.

The cooking chamber 702 has a bottom wall, schematically illustrated in FIGS. 19, 20 and 21, and indicated with reference number 702a, preferably, but not necessarily, at least partially, basin-shaped, so as to better collect grease dripping from the foodstuffs being cooked.

Advantageously, the bottom wall 702a is provided with a cooking chamber outlet 704 fluidly connected to a drain conduit 704a, for draining outside the cooking chamber 702 grease or other substances accumulated therein.

Preferably, but not necessarily, the drain conduit 704a is provided with a drain valve 704b.

Advantageously, the cooking oven 701 is provided with a control unit, schematically illustrated in FIG. 9 by a dashed square 1300, preferably configured for controlling the electric and electronic components of the cooking oven 701.

Advantageously, the cooking oven 701 further comprises a heating device 723 configured for heating the internal of the cooking chamber 702; the heating device 723 can be, for example, an electrical heater, or (as in the examples illustrated in attached figures) hot tubes wherein the hot fumes exiting a gas burner flows, a heat exchanger, etc.

Advantageously, the cooking oven 701 comprises a perforated suction wall 718 separating the cooking chamber 702 from a heating chamber 719 containing, at least partially, the heating device 723, and, preferably, a fan 720 configured for circulating heated air through the cooking chamber 702 and the heating chamber 719.

The cooking oven 701 can also advantageously comprise a vapour outlet duct, not illustrated, configured for discharging vapour from the cooking chamber 702.

Advantageously, the cooking oven 701 comprises a steam generator 703 configured for producing steam and fluidly connected to the cooking chamber 702 for releasing steam into the latter.

Advantageously, the steam generator comprises a liquid container 703a adapted to contain water, and fluidly connected to the cooking chamber, and a heat source 703b at least partially arranged in the liquid container 703a for heating water contained therein.

Advantageously, the heat source 703b can be an electric heater, or heat exchanger, for example one or more pipes in which gasses exiting a gas burner can flow.

Advantageously, the steam generator 703 comprises a drain conduit, not illustrated, for emptying the liquid container 703a.

Advantageously, the cooking oven 701 comprises a cleaning system 770 for cleaning the cooking chamber 702 and the steam generator 703.

Preferably the cleaning system 770 comprises an additive drawer 705 loadable with a washing/rinsing additive, for example a detergent and/or a degreaser, a brightener and/or a descaling additive.

Advantageously, the additive drawer 705 comprises a liquid inlet 709 configured for taking a liquid therein, and is fluidly connected or connectable both to the inside of the cooking chamber 702 and to the inside of the steam generator 703.

Preferably, the liquid inlet 709 is connected or connectable to a source 790 of water external to the cooking oven 701, for example to the water mains of the building where the cooking oven is installed.

More preferably, the cooking oven comprises a first valve 791 interposed between the liquid inlet 709 and the source 790 of water external to the cooking oven 701.

In an advantageous embodiment, the additive drawer 705 comprises:
- a first liquid outlet 710 fluidly connecting the inside of the additive drawer 705 to the inside of the cooking chamber 702;
- a second liquid outlet 711 fluidly connecting the inside of the additive drawer 705 to the inside of the steam generator 703.

In this advantageous embodiment, therefore, a washing/rinsing liquid (i.e. water entered into the drawer via the liquid inlet 709 and mixed with a washing/rinsing additive contained in the drawer 705) exits the additive drawer 705 via two separates ways (i.e. the first and second liquid outlets), each connected, preferably autonomously, respectively to the cooking chamber 702 and to the steam generator 703.

In an advantageous embodiment, like in the examples of the attached figures, the additive drawer 705 comprises:
- a hollow housing 706, wherein a cleaning additive can be loaded, having a first end 707 opened;
- a cap 708 configured being removably fixed to the hollow housing 706 and removably closing the first end 707 of the latter.

Preferably, like in the examples of attached figures, the cap 708 is configured for entering and being positioned within the first end 707 of the hollow housing 706 and being fixed therein.

Preferably, like in the examples of attached figures, the additive 1000 is in the form of tabs or tablets; anyway, the additive can be also a powder, a liquid, a gel, etc.

Preferably, the cap 708 is fixed or fixable to the hollow body 706 by a bayonet-type or a screw-type closure.

In the examples of attached figures, the closure is a bayonet-type closure, and advantageously comprises one or more pins 750, protruding preferably from external surface 708*a* of the cap 708 facing the internal surface 706*a* of the hollow housing 706 when the cap 708 is fixed to the latter; the pins 750 are adapted to be engaged in a suitable seat 751 obtained in the internal surface 6*a* of the hollow housing 706.

In a further advantageous embodiment, not illustrated, the pin(s) can be provided in the internal surface 706*a* of the hollow housing 706, and the seat(s) in the external surface 708*a* of the cap 708.

Advantageously, the pin(s) 750 and the seat(s) are configured in such a way that a rotation of the cap 708 with respect to the hollow housing 706 fixes the cap 708 to the latter when the pin(s) 750 reaches/reach the end of the seat(s).

Anyway, other kind of closure (e.g. a screw-type closure, a form-fit closure, etc.) for removably fixing the cap 708 to the hollow housing 706 are possible.

Preferably, the cap 708 is provided with handling device 708*b*, for facilitating the grapping of the cap 708; in the example of FIGS. 10 to 16, the handling device advantageously comprises a couple of wings, advantageously protruding radially from a cylindrical inner surface 708*c* of the cap 708 which is accessible from the external to the hollow housing 706 when the cap 708 is fixed to the latter.

In further advantageous embodiment, like in the example of FIG. 17, the additive drawer 705 comprises a support 755 for an additive, configured for supporting an additive (preferably in the form of a tab 1000) within the hollow housing 706 when the cap 708 is fixed to the hollow housing 706. In the advantageous embodiment of FIG. 17 the support 755 is a cylindrical crown or protrusion protruding from the inner wall 708*d* of the cap 708 facing the internal of the hollow housing 706 when the cap 708 is fixed to the latter.

In a further advantageous embodiment, the additive drawer 705 comprises a sealing system configured for favouring the hermetic closure of the first end of the hollow body by the cap.

Preferably, the sealing system is comprised in the cap 708.

In an advantageous embodiment, the cap 708 comprises:
- a fixed portion 781 removably fixable to the hollow housing 706;
- a closure portion 782 movable with respect to the fixed portion 781, and configured for being selectively moved, when the fixed portion 781 is fixed to the hollow housing 706, to a "closing position" (illustrated for example in FIG. 13) in which it hermetically seals the first end 707 of the hollow housing 706;
- an active closure system configured for forcing the closure portion 782 into the closing position when the fixed portion 781 is fixed to the hollow housing 706.

Advantageously, the sealing system comprises such fixed portion 781, closure portion 782, and active closure system.

Preferably, the fixed portion 781 is fixed or fixable to the hollow body 706 by a bayonet-type or a screw-type closure, or by any kind of removable closure. In the advantageous embodiment illustrated in FIGS. 10 to 16, the pins 750 are provided on the fixed portion 781.

Preferably the closure portion 782 abuts, in the closing position, against an abutment 706*b* provided at the first end 707 of the hollow housing 76, internally to the latter for hermetically closing such a first end 707.

Preferably, the closure portion 782 comprises a gasket 783 configured for abutting against the abutment 706*b*.

In a preferred embodiment, the active closure system is configured for allowing the closure portion 782 to be moved away from the closing position when the pressure within the hollow housing exceeds a prefixed threshold. In this preferred embodiment, therefore, the active closure system has also the function of a safety system, which prevents overpressures within the additive drawer 705. This safety system can be particularly useful in some configurations of the oven according to the invention in which the additive drawer works with an internal pressure above atmospheric pressure.

In a preferred embodiment, the active closure system comprises a resilient element acting between the fixed portion 781 and the closure portion 782 for exerting an elastic force pushing the closure portion 782 into the closing position when the fixed portion 781 is fixed to the hollow housing 706.

In a preferred embodiment, the resilient element comprises a coil spring 784 positioned between the fixed portion 781 and the closure portion 782 and configured for being compressed when the fixed portion is fixed to the hollow housing 706, so as to push the closure portion 782 away from the fixed portion 781, towards the closing position.

In a further advantageous embodiment, not illustrated, the resilient element can comprise a pneumatic spring.

In the advantageous embodiment of FIGS. 10 to 16, the fixed portion 781 comprises a cylindrical wall 781*a*, from which internal surface protrudes an internal septum 781*b*, advantageously dividing the cylindrical wall 781*a* in two cylinders.

Preferably, the internal septum 781*b* comprises a bulge 781*c* in its central region.

In the advantageous embodiment of FIGS. 10 to 16, the closure portion 782 comprises a disk-shaped portion 782*a*, configured for abutting, preferably with the interposition of the gasket 783, with the abutment 706a of the hollow housing 706.

In the advantageous embodiment of FIGS. 10 to 16, the closure portion 782 comprises a cylindrical portion 782b, protruding from the disk-shaped portion 782a towards the internal septum 781b of the fixed portion 781, and advantageously positioned within the cylindrical wall 781a of the latter.

In the advantageous embodiment of FIGS. 10 to 16, the coil spring 784x is positioned between the disk-shaped portion 782a of the closure portion 782 and the internal septum 781b of the fixed portion 781, so as to be compressed between these two elements when the fixed portion 781 is fixed to the hollow housing 706, and exerting a force on the disk-shaped portion 782a towards the abutment 706a, that ensure the seal between these components.

Preferably, the closure portion 782 is movably associated to the fixed portion 781 by a pin 785, fixed to the closure portion 782 and slidably supported by the fixed portion 781; in the advantageous embodiment of FIGS. 10 to 16, the pin 785 is fixed to a central region of the disk-shaped portion 782a, and it is slidably supported by a central region of the internal septum 781b, preferably by the bulge 781c of the latter.

In the advantageous embodiment of FIG. 17, the sealing system advantageously comprises one or more O-rings 800 protruding from the external surface 708a of the cap 708 facing the internal surface 706a of the hollow housing 706 when the cap 708 is fixed to the latter and adapted to abut against this internal surface 706a for ensuring the watertight of the closure. Clearly, a support 755 like the one of FIG. 17 can be provided also in the embodiment of FIGS. 10 to 16; for example the support 755 can protrude from the closure portion 782 towards the internal of the hollow housing.

In the advantageous embodiments of attached figures, the hollow housing 706 has a tubular shape, preferably cylindrical, and comprises a lateral wall 760, the first end 707 of the hollow housing 706, and a second end 770, opposite the first end 707, and closed.

In the advantageous embodiments of attached figures, the liquid inlet 709, the first liquid outlet 710 and the second liquid outlet 711 are positioned at the second end 770 of the hollow housing 706.

In the advantageous embodiments of attached figures, the hollow housing 706 comprises connection elements 709a, 710a, 711a, protruding from its second end 770 towards the external of the hollow housing 706 for fluidly connecting respectively the liquid inlet 709, the first liquid outlet 710 and the second liquid outlet 711 to pipes or tubes external to the drawer 705.

In advantageous embodiments, like in attached figures, the hollow housing 706 comprises a diverting element for diverting a liquid entering the hollow housing 706 from the liquid inlet 709 to the first liquid outlet 710 and/or to the second liquid outlet 711.

In a preferred embodiment, the diverting element comprises a septum 722 protruding from the internal wall of the second end 770 of the hollow housing 706 towards the internal of the latter.

Advantageously, the liquid inlet 709 and at least one between the first liquid outlet 710 and the second liquid outlet 711 are positioned on opposite sides with respect to the septum 722. The septum 722 defines an optimised path for the liquid moving from the liquid inlet 709 to the liquid outlets 710, 711 which optimises the dissolution of the additive contained in the hollow housing 706, in particular if the latter is in form of tabs.

In an advantageous embodiment, the first liquid outlet is connected to the cooking chamber via a first piping system 726 having an outlet 726a into the cooking chamber 702.

In an advantageous embodiment, like in the one illustrated in FIG. 711, the additive drawer 705 is positioned, when the cooking oven 701 is in its operative position (i.e. installed to be operated, and it lies in a horizontal, or substantial horizontal, plane such as the floor of a room, or the internal bottom wall of a piece of furniture in which the oven is built-in), higher than a bottom wall 702a of the cooking chamber 702, and the outlet 726a of the first piping system 726 is positioned, when the cooking oven 701 is in its operative position, lower than the additive drawer 705, so that a liquid can pass from the inside of the hollow housing to the inside of the cooking chamber by gravity.

Figure 15:
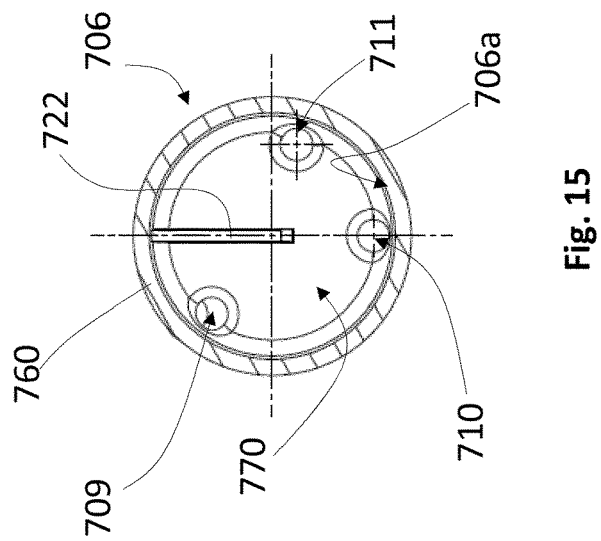
FIG. 15 is a cross section operated according to line VII-VII of FIG. 14.
Figure 14:
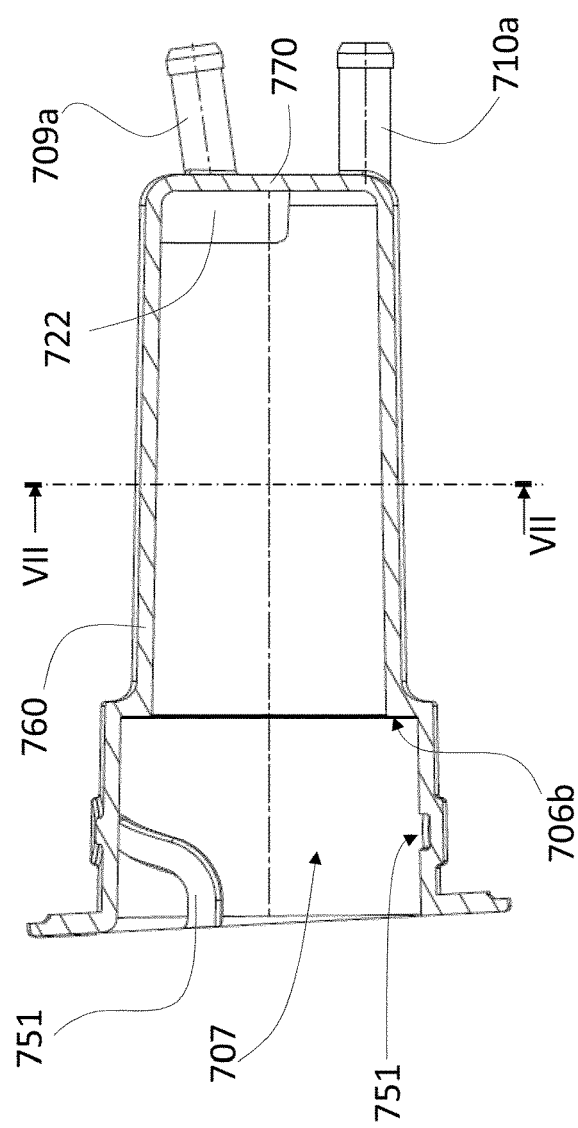
FIG. 14 is a longitudinal cross section of the hollow body of an additive drawer according to the invention.
Figure 16:
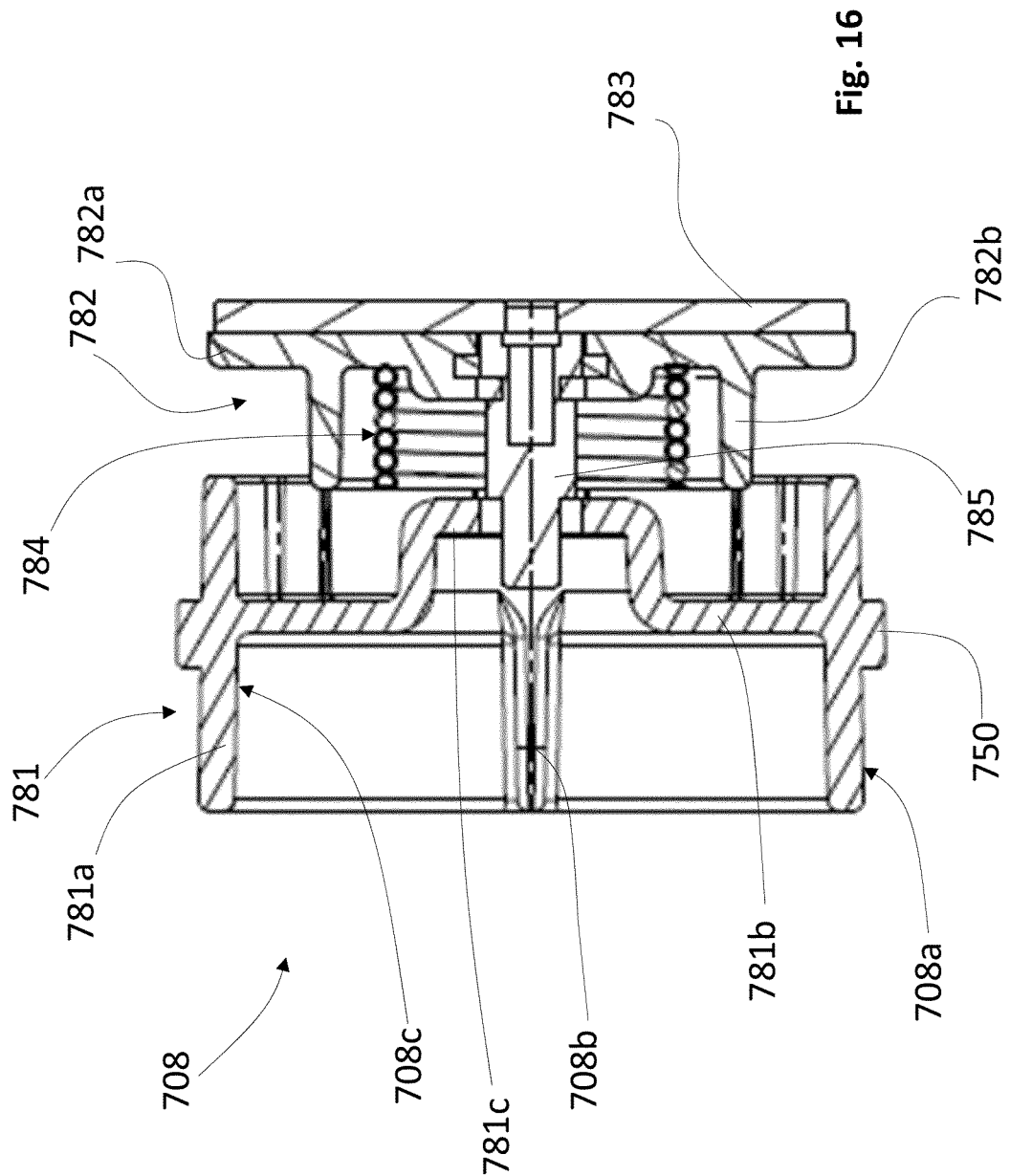
FIG. 16 is a longitudinal cross section of the cap of an additive drawer according to the invention.

Preferably, as shown for example in FIGS. 15 and 18, the first liquid outlet 710 is positioned in such to be, when the cooking oven 701 is in its operative position, substantially tangent to the lower region (or internal bottom) of the internal surface 706a of the hollow housing 706, so that all the liquid present within the latter can exit the first liquid outlet 710 by gravity.

Preferably, the first piping system comprises a second valve 726b interposed between the first liquid outlet 710 of the additive drawer 705 and the outlet 726a of the first piping system 726.

In a further advantageous embodiment, the oven 701 comprises a first pump 728 configured for taking a liquid from the first liquid outlet 710 of the additive drawer 705 into the cooking chamber 702 via the first piping system 726.

In this case, the additive drawer 705 can be also positioned below the cooking chamber 702, since the first pump 728 allows the liquid contained into the additive drawer 705 to reach the cooking chamber 702, even without the effect of the gravity force.

Preferably, the second valve 726b is positioned between the first pump 728 and the first liquid outlet 726 of the additive drawer 705.

Preferably, the first pump 728 is configured for being able to completely empty the additive drawer 705 via the first liquid outlet 710.

In a further advantageous embodiment, like the one illustrated in FIG. 21, the first piping system 726 comprises a circulation system 729 configured for pumping liquid out of the cooking chamber 702 and for pumping such liquid, or a part thereof, again in the cooking chamber 702.

Advantageously, the first liquid outlet 710 is fluidly connected to the circulation system 729 in such a way to take a liquid from the inside of the hollow housing 706 into the circulation system 729, and from the circulation system 729 into the cooking chamber.

Advantageously, the outlet of the circulation system coincides with the outlet 726a of the first piping system 726.

In an advantageous embodiment, the circulation system 729 comprises a second pump 730 configured for pumping liquid out of the cooking chamber 702 and for pumping such liquid, or a part thereof, again in the cooking chamber 702.

Preferably, the second valve 726b is positioned between the second pump 730 and the first liquid 710 outlet of the additive drawer 705.

Preferably, the second pump 730 is configured for being able to completely empty the additive drawer via the first liquid outlet 710.

Advantageously the control unit 1300 is configured for determining if the additive drawer 705 is empty.

Preferably, the control unit 1300 can be configured for determining the emptying status of the additive drawer 705 by measuring the elapsed time from the activation of the first pump 728.

In a further advantageous embodiment, the control unit 1300 can be configured for determining the emptying status of the additive drawer 705 by measuring the elapsed time from the activation of the second pump 730.

In a further advantageous embodiment, the control unit 705 is configured for determining the emptying status of the additive drawer 705 by measuring the current absorption of the first pump 728, and more preferably the variations of the current absorption.

In a further advantageous embodiment, the control unit 1300 is configured for determining the emptying status of the additive drawer 705 by measuring the current absorption of the second pump 730, and more preferably the variations of the current absorption.

In a further advantageous embodiment, the control unit 1300 is configured for determining the emptying status of the additive drawer 705 by measuring the rotation speed of the first pump 729, and more preferably the variations of the rotation speed.

In a further advantageous embodiment, the control unit 1300 is configured for determining the emptying status of the additive drawer 705 by measuring the rotation speed of the second pump 730, and more preferably the variations of the rotation speed.

In a further advantageous embodiment, the control unit 1300 is configured for determining the emptying status of the additive drawer 705 by measuring the measuring the vibration levels of the first pump 729, for example by means of an accelerometer, not illustrated and more preferably by threating statistically the vibration levels data.

In a further advantageous embodiment, the control unit is configured 1300 for determining the emptying status of the additive drawer 705 by measuring the measuring the vibration levels of the second pump 730, for example by means of an accelerometer, not illustrated, and more preferably by threating statistically the vibration levels data.

In an advantageous embodiment, the second liquid outlet 711 is connected to the steam generator 703 via a second piping system 731 having an outlet 731a into the steam generator 703.

Preferably, the second piping system 731 comprises a third valve 731b interposed between the second liquid outlet 711 of the additive drawer 705 and the outlet 731a of the second piping system 731.

The functioning of the cooking oven 701 according to the invention is illustrated in the following.

For example after having performed one or more cooking processes, the oven can be cleaned by activating the cleaning system 770.

The cleaning procedure can comprise one or more washing phases and one or more rinsing phases; in one or more of the rinsing phases, a descaling agent can be added. Alternatively, or in addition, one or more dedicated descaling phases can be performed.

Preferably, the last rinsing phase is performed using only clean water, so as to remove all possible additive residuals present in the cooking oven 701.

In one or more of the washing or rinsing, or descaling phases an additive 1000 (e.g. a degreaser in the washing phase, a descaling additive or a brightener in the rinsing phase) can be loaded into the additive drawer 705.

With reference to the embodiment of FIGS. 10 to 16, the cap 708 can be removed from the hollow housing 706, an additive 1000 can be positioned within the latter, and the cap 708 can be fixed to the first end 707 of the hollow housing 706, to close the latter.

In this advantageous embodiment, once the fixed portion 781 is fixed (for example by the bayonet-type closure) to the hollow housing 706, the active closure system pushes the closure portion 782 against the abutment 706b of the hollow housing 706, so as to watertight seal the latter.

Once the additive 1000 is loaded into the additive drawer, the washing or rinsing procedure can be activated, for example by the control unit 1300.

In the advantageous embodiment of FIG. 17, the user can load an additive 1000 (e.g. a descaling additive) directly in the support 755 of the cap 708 before fixing the latter to the hollow housing 706.

In the embodiment of FIG. 19, by opening the first valve 791, clean water (schematically illustrated with arrows 1200 in FIG. 13), enters the additive drawer 705 from the liquid inlet 709, and strikes the additive 1000, melting the latter.

Then, a mixture 1250 of water and additive can exit the additive drawer 705 via the first or second liquid outlet.

In the embodiment of FIG. 19, by closing the second valve 726b and opening the third valve 731b (if provided), thanks to the pressure of the water present in the source of water 790, and to the fact that the drawer 705 is watertight closed by the cap 708, the mixture 1250 exits the drawer 705 via the second liquid outlet 711, and goes to the steam generator 703 via the second piping system 731.

By opening the second valve 726b, the mixture 1250 exits the drawer 705 via the first liquid outlet 710, and goes to the cooking chamber 702 via the first piping system 726.

The control unit 1300 can be programmed in such a way to take the mixture 1250 firstly to the steam generator 703, or firstly to the cooking chamber 702, or contemporaneously, simply by deciding the order of opening of the second valve 726b, and if provided also of the third valve 731b.

By regulating the opening time of the second valve 726b, and if provided also of the third valve 731b, the control unit 1300 can also dose the quantity of additive provided to the cooking cavity 702 and the steam generator 703.

In the embodiment of FIG. 19, if the first liquid outlet 710 is positioned in such a way to be, when the cooking oven 701 is in its operative position, substantially tangent to the lower region (or internal bottom) of the internal surface 706a of the hollow housing 706, once the washing or rinsing phase is ended, the additive drawer 705 can be completely emptied, with the first valve 791 closed, simply by opening the second valve 726b (and if present also the third valve 731b), so that all the liquid present in the drawer 705 is taken to the bottom 702a of the cooking chamber 702 via the first liquid outlet 710 by gravity; then the liquid present in the bottom 702a of the cooking chamber can be drained outside the oven 701 via the drain conduit 704a.

The functioning of the embodiment of FIG. 20 differs from the one of FIG. 19 substantially because in order to completely empty the additive drawer 705, with the first valve 791 closed, it is necessary opening the second valve 726b (and if present also the third valve 731b), and activating the first pump 728.

Figure 10:
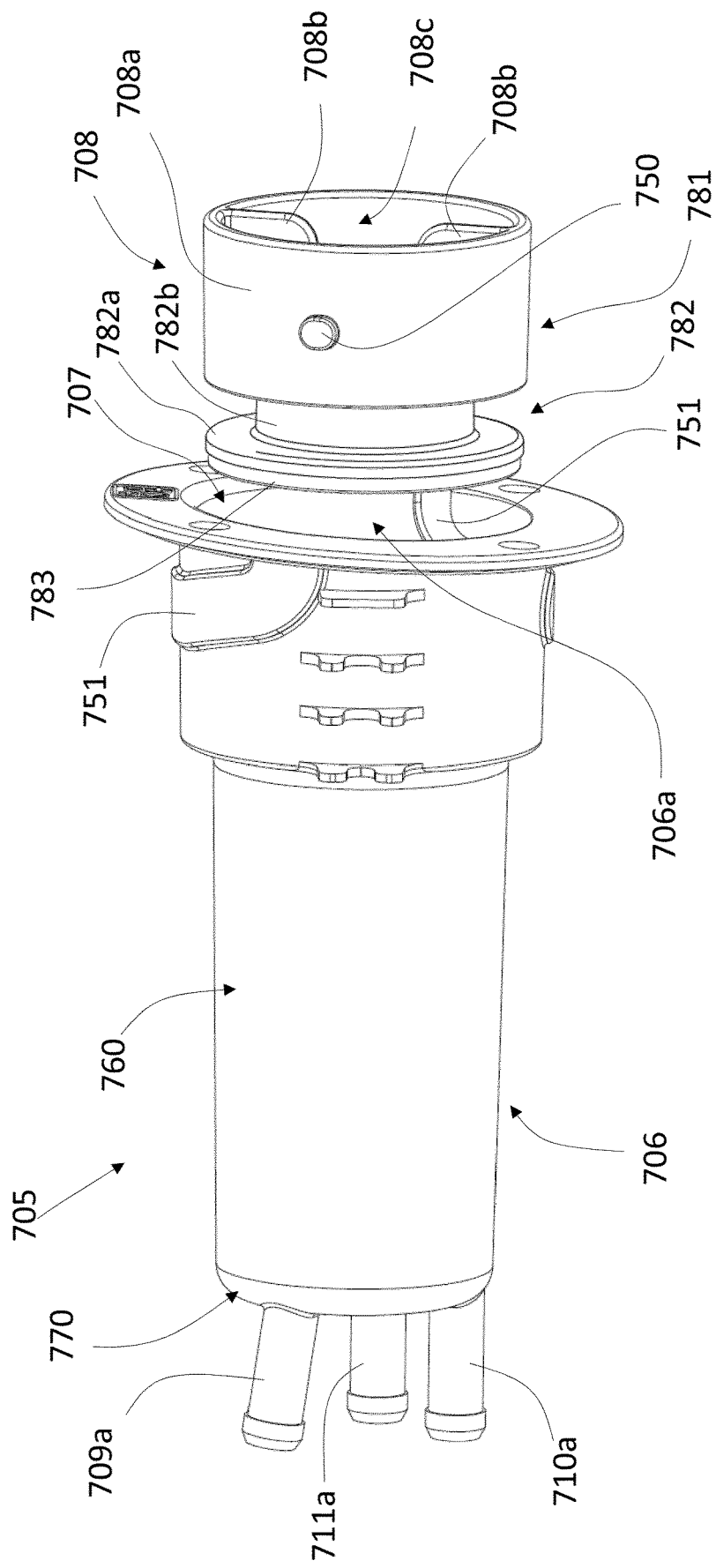
FIG. 10 is a perspective view of a first embodiment of an additive drawer of an oven according to the invention, in an open condition.
Figure 11:
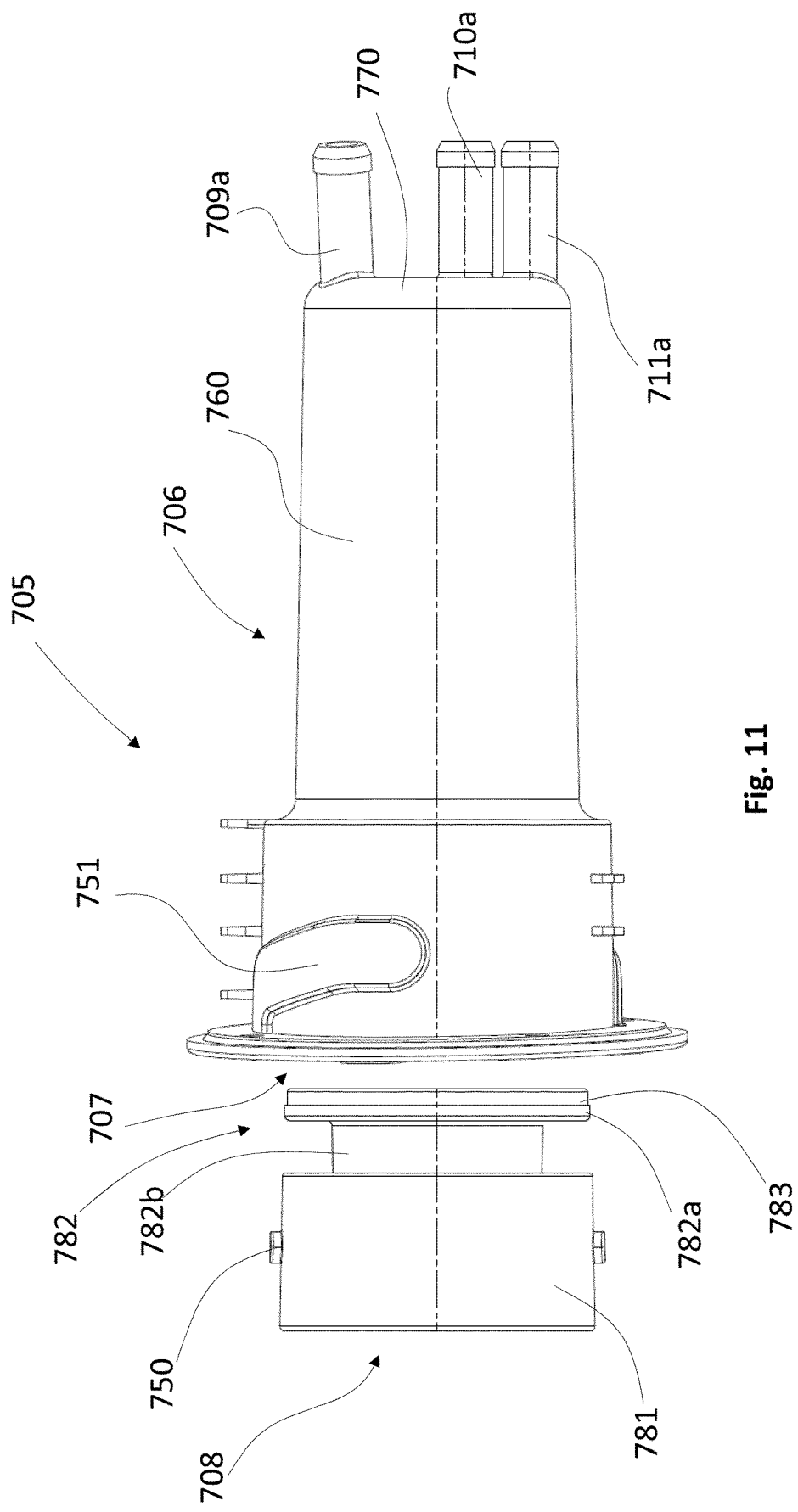
FIG. 11 is a plan view of the additive drawer of FIG. 10, in an open condition.
Figure 12:
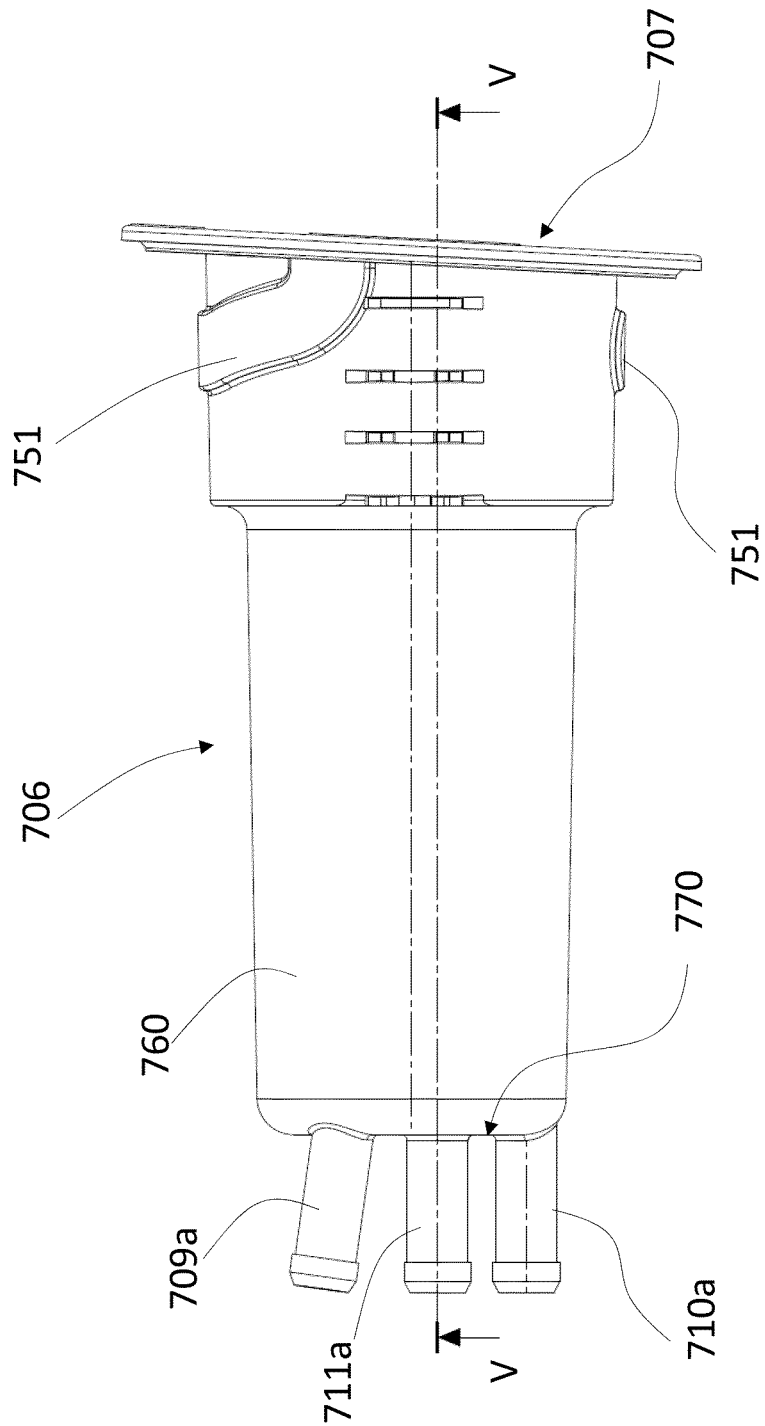
FIG. 12 is a lateral view of the additive drawer of FIG. 10, in a closed condition.
Figure 13:
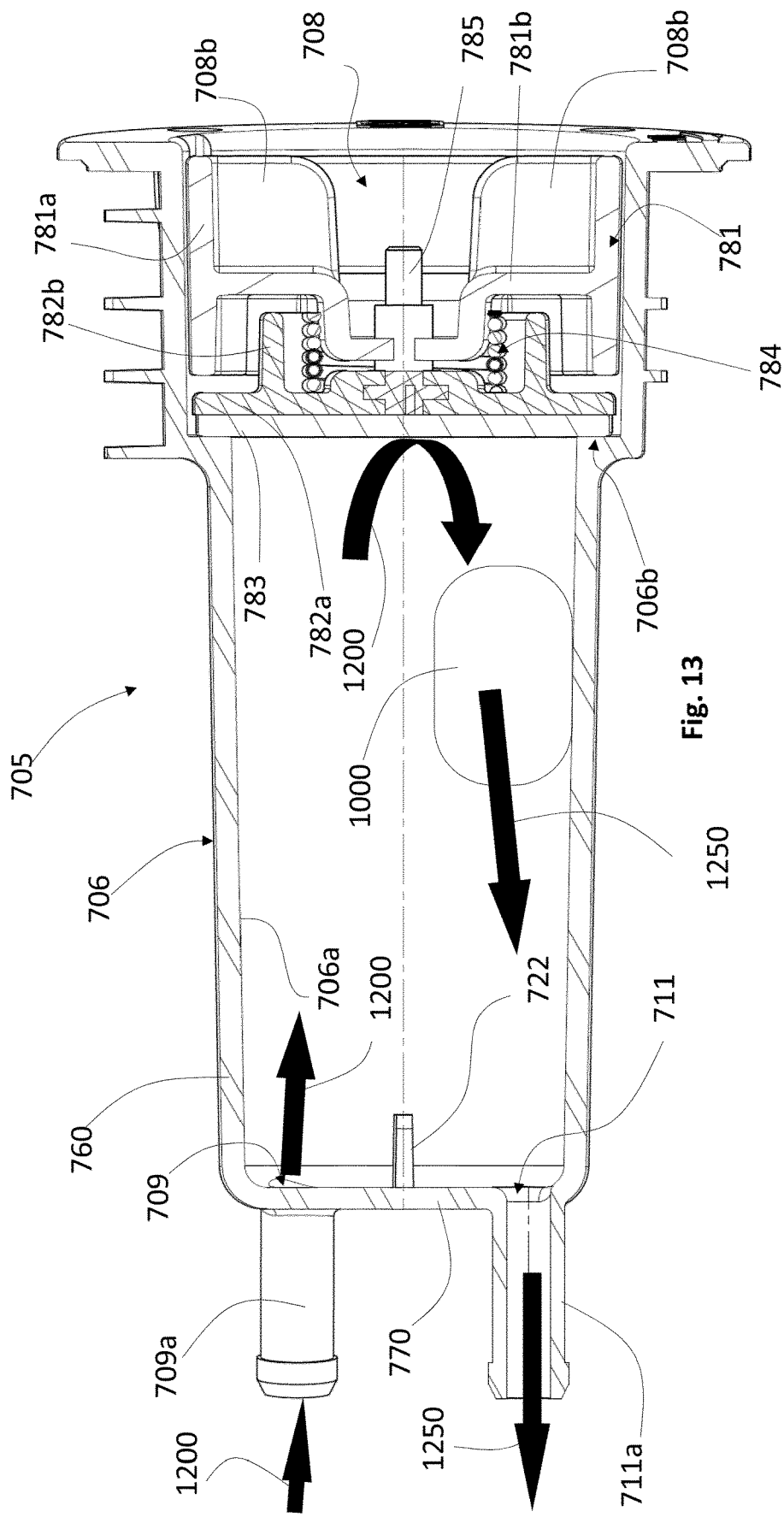
FIG. 13 is a cross section operated according to plane V-V of FIG. 12.

In addition, in the embodiment of FIG. 10, the first pump 728 can be operated also during the supply of the mixture 1250 to the cooking chamber 702.

The functioning of the embodiment of FIG. 21 differs from the embodiment of FIG. 20 substantially because in the embodiment of FIG. 21 the mixture 1250 is supplied to the circulation system 729, and not directly within the cooking chamber 702; once the mixture 1250 is within the circulation system 729, the second pump 730 circulates it within the cooking chamber.

In addition, in the embodiment of FIG. 21, in order to completely empty the additive drawer 705, with the first valve 791 closed, it is necessary opening the second valve 726*b* (and if present also the third valve 731*b*), and activating the second pump 730, which sucks the mixture from the drawer 705 via the first liquid outlet 710.

In addition, in the embodiment of FIG. 21, the second pump 730 can be operated also during the supply of the mixture 1250 to the circulation system 729.

It is seen therefore how the invention achieves the proposed aim and objects, there being provided a cooking oven in which, in particular thanks to the inventive additive drawer of its cleaning system, the number and the complexity of the operations the user has to perform in order to clean the oven, and therefore the time needed for performing such operations is reduced.

In addition, by regulating the opening time and durations of the first, second, and third valves, there is the possibility to set the order of the cleaning procedure, for example deciding to clean firstly the steam generator and then the cooking cavity, or vice versa, and also to better dose the additives.

The risk that the used can use the wrong additive or dosing for one of the steam generator and the cooking cavity, or that he/she forgets to clean the steam generator or the cooking cavity is highly reduced.

List of Examples

1) Cooking oven (701) comprising:
   a cooking chamber (702) wherein foodstuffs can be placed for being cooked,
   a steam generator (703) configured for producing steam and fluidly connected to said cooking chamber (702) for releasing steam into the latter;
   a cleaning system (770) for cleaning said cooking chamber (702) and said steam generator (703), comprising an additive drawer (705) loadable with a washing/rinsing additive;
characterized in that
said additive drawer (705) comprises a liquid inlet (709) configured for taking a liquid therein, and is fluidly connected or connectable both to the inside of said cooking chamber (702) and to the inside of said steam generator (703).
2) Cooking oven, according to example 1, wherein said additive drawer (705) comprises:
   a first liquid outlet (710) fluidly connecting the inside of said additive drawer (705) to the inside of said cooking chamber (702);
   a second liquid outlet (711) fluidly connecting the inside of said additive drawer (705) to the inside of said steam generator (703).
3) Cooking oven (701), according to example 1 or 2, wherein said additive drawer (705) comprises:
   a hollow housing (706), wherein a cleaning additive can be loaded, having a first end (707) opened;
   a cap (708) configured for being removably fixed to said hollow housing (706) and removably closing said first end (707) of the latter.
4) Cooking oven (701), according to example 3, wherein said cap (708) comprises a support (755) for an additive, configured for supporting an additive within said hollow housing (706) when said cap (708) is fixed to said hollow housing (706).
5) Cooking oven (701), according to example 3 or 4, wherein said additive drawer (705) comprises a sealing system configured for favouring the hermetic closure of said first end (707) of said hollow body (706) by said cap (708).
6) Cooking oven (701), according to one or more of examples 3 to 5, wherein said additive drawer (705) comprises a safety system (750) configured for automatically opening said first end (707) of said hollow body (706) if the internal pressure exceeds a prefixed threshold.
7) Cooking oven (701) according to one or more of examples 3 to 6, wherein said cap (708) comprises:
   a fixed portion (781) removably fixable to said hollow housing (706),
   a closure portion (782) movable with respect to said fixed portion (781), and configured for being selectively moved, when said fixed portion (781) is fixed to said hollow housing (706), to a closing position in which it hermetically seals said first end (707) of said hollow housing (706),
   an active closure system (784) configured for forcing said closure portion (782) into said closing position when said fixed portion (781) is fixed to said hollow housing (706).
8) Cooking oven (701) according to example 7, wherein said active closure system (784) comprises a resilient element (784) acting between said fixed portion (781) and said closure portion (782) for exerting an elastic force pushing said closure portion (782) into said closing position when said fixed portion (781) is fixed to said hollow housing (706).
9) Cooking oven (701), according to one or more of examples 3 to 8, wherein said hollow housing (706) has a tubular shape, and comprises a lateral wall (760), said first end (707), and a second end (770), opposite said first end (707), and closed.
10) Cooking oven (1), according to example 9, wherein said liquid inlet (9), said first liquid outlet (10) and said second liquid outlet (11) are positioned at said second end (70) of said hollow housing (6).
11) Cooking oven (701), according to one or more of examples 2 to 10, wherein said hollow housing (706) comprises a diverting element (722) for diverting a liquid entering said hollow housing (706) from said liquid inlet (709) to said first liquid outlet (710) and/or to said second liquid outlet (711).
12) Cooking oven (701), according to one or more of examples 2 to 11, wherein said first liquid outlet (710) is connected to said cooking chamber (703) via a first piping system (726) having an outlet (726*a*) into said cooking chamber (702).
13) Cooking oven (71), according to example 12, wherein said additive drawer (705) is positioned, when said cooking oven (701) is in its operative position, higher than a bottom wall (702*a*) of said cooking chamber (702), and wherein said outlet (726*a*) of said first piping system (726) is positioned, when said cooking oven (701) is in its operative position, lower than said additive drawer (705), so that a liquid can pass from the inside of said hollow housing (706) to the inside of said cooking chamber (702) by gravity.
14) Cooking oven (701), according to example 12 or 13, comprising a first pump (728) configured for taking a liquid from said first liquid outlet (710) of said additive drawer (705) into said cooking chamber (702) via said first piping system (726).

15) Cooking oven (701), according to one or more of examples 12 to 14, wherein said first piping system (726) comprises a circulation system (729) configured for pumping liquid out of said cooking chamber (702) and for pumping such liquid, or a part thereof, again in said cooking chamber (702), wherein said first liquid outlet (710) is fluidly connected to said circulation system (729) in such a way to take a liquid from the inside of said hollow housing (706) into said circulation system (729), and from said circulation system (729) into said cooking chamber (702).

The invention claimed is:

1. A cooking oven (1) for foodstuffs, comprising:
a cooking chamber (2), wherein foodstuffs can be placed for being cooked, having a bottom wall (3) provided with a first cooking chamber outlet (4) positioned at a lowermost point along said bottom wall (3) to receive grease that drips from the foodstuffs and collects on said bottom wall (3);
a grease conduit (6) configured for draining grease from said cooking chamber (2), wherein said first cooking chamber outlet (4) is fluidly connected to said grease conduit (6);
a heating device (8) configured for heating the internal of said cooking chamber (2); and
a vapour outlet duct (9) configured for discharging vapour from said cooking chamber (2);
wherein said bottom wall (3) of said cooking chamber (2) is provided with a second cooking chamber outlet (10), distinct from said first cooking chamber outlet (4) and fluidly connected to said vapour outlet duct (9); and
wherein an inlet border (10a) of said second cooking chamber outlet (10) is placed at a raised position with respect to the inlet border (4a) of said first cooking chamber outlet (4), such that, in use, grease collected on said bottom wall (3) first enters said first cooking chamber outlet (4) rather than said second cooking chamber outlet (10).

2. The cooking oven (1) according to claim 1, wherein said bottom wall (3a) of the cooking chamber (2) is at least partially funnel-shaped, at least at or in proximity to an inlet border (4a) of said first cooking chamber outlet (4).

3. The cooking oven (1) according to claim 1, wherein said second cooking chamber outlet (10) is fluidly connected, in addition to said vapour outlet duct (9), to said grease conduit (6).

4. The cooking oven (1) according to claim 3, wherein said second cooking chamber outlet (10) is fluidly connected to said grease conduit (6) via a connection duct (50) whose end portion (50a) protrudes within said grease conduit (6), substantially perpendicularly to an internal surface of the latter.

5. The cooking oven (1) according to claim 1, and further comprising a cleaning system (70) including a circulation system (7) configured for pumping liquid out of said cooking chamber (2) and for pumping such liquid, or a part thereof, again in said cooking chamber (2).

6. The cooking oven (1) according to claim 5, wherein said first cooking chamber outlet (4) is fluidly connected, in addition to said grease conduit (6), to said circulation system (7).

7. The cooking oven (1) according to claim 5, wherein said second cooking chamber outlet (10) is fluidly connected, in addition to said vapour outlet duct (9), to said circulation system (7).

8. The cooking oven (1) according to claim 5, wherein said circulation system (7) comprises a circulation pump (7a), an aspiration conduit (7b) connecting said circulation pump (7a) to said first cooking chamber outlet (4) and/or to said second cooking chamber outlet (10), and a delivery conduit (7c) connecting said circulation pump (7a) to a washing/rinsing liquid circulation outlet (13) provided in said cooking chamber (2) and configured for allowing washing/rinsing liquid to enter said cooking chamber (2).

9. The cooking oven (1) according to claim 5, wherein said cleaning system (70) comprises a washing/rinsing liquid introduction system (16) configured for taking washing/rinsing liquid within said cooking chamber (2), said washing/rinsing liquid introduction system (16) comprising an introduction conduit (16a) fluidly connected to said cooking chamber (2) and configured for selectively supplying into the latter washing and/or rinsing liquid.

10. The cooking oven (1) according to claim 5,
wherein said circulation system (7) comprises a circulation pump (7a), an aspiration conduit (7b) connecting said circulation pump (7a) to said first cooking chamber outlet (4) and/or to said second cooking chamber outlet (10), and a delivery conduit (7c) connecting said circulation pump (7a) to a washing/rinsing liquid circulation outlet (13) provided in said cooking chamber (2) and configured for allowing washing/rinsing liquid to enter said cooking chamber (2);
wherein said cleaning system (70) comprises a washing/rinsing liquid introduction system (16) configured for taking washing/rinsing liquid within said cooking chamber (2), said washing/rinsing liquid introduction system (16) comprising an introduction conduit (16a) fluidly connected to said cooking chamber (2) and configured for selectively supplying into the latter washing and/or rinsing liquid; and
wherein an outlet (16c) of said introduction conduit (16a) is separated from said washing/rinsing liquid circulation outlet (13), or wherein the outlet of said introduction conduit (16a) into said cooking chamber (2) coincides with said washing/rinsing liquid circulation outlet (13).

11. The cooking oven (1) according to claim 8, wherein said aspiration conduit (7b) is fluidly connected to said second cooking chamber outlet (10) via a by-pass conduit (14) fluidly connecting said aspiration conduit (7b) to said vapour outlet duct (9), to which said second cooking chamber outlet (10) is fluidly connected.

12. The cooking oven (1) according to claim 5, wherein said cleaning system (70) comprises a washing/rinsing additive supplying system (27) configured for supplying washing and/or rinsing additives to the internal of said cooking chamber (2), and/or a washing/rinsing additive multi-dosing system (31) configured for supplying to the internal of said cooking chamber (2) metered amounts of washing and/or rinsing additives.

13. The cooking oven (1) according to claim 5, comprising a steam supply system (35) configured for producing and supplying steam into the cooking chamber (2), wherein said cleaning system (70) is configured for supplying a washing/rinsing liquid to said steam supply system (35).

14. A cooking oven (1) for foodstuffs, comprising:
a cooking chamber (2), wherein foodstuffs can be placed for being cooked, having a bottom wall (3) provided with a first cooking chamber outlet (4) positioned in such a way to receive grease that drips from the foodstuffs and collects on said bottom wall (3);

a grease conduit (6) configured for draining grease from said cooking chamber (2), wherein said first cooking chamber outlet (4) is fluidly connected to said grease conduit (6);

a heating device (8) configured for heating the internal of said cooking chamber (2); and a vapour outlet duct (9) configured for discharging vapour from said cooking chamber (2);

wherein said bottom wall (3) of said cooking chamber (2) is provided with a second cooking chamber outlet (10), distinct from said first cooking chamber outlet (4) and fluidly connected to said vapour outlet duct (9);

wherein an inlet border (10a) of said second cooking chamber outlet (10) is placed at a raised position with respect to the inlet border (4a) of said first cooking chamber outlet (4), such that, in use, grease collected in said bottom wall (3) first enters said first cooking chamber outlet (4) rather than said second cooking chamber outlet (10); and wherein a shield element (300) is positioned to prevent grease from entering said second cooking chamber outlet (10).

15. The cooking oven (1) according to claim 14, wherein said bottom wall (3a) of the cooking chamber (2) is at least partially funnel-shaped, at least at or in proximity to an inlet border (4a) of said first cooking chamber outlet (4).

16. The cooking oven (1) according to claim 14, wherein said second cooking chamber outlet (10) is fluidly connected, in addition to said vapour outlet duct (9), to said grease conduit (6).

17. The cooking oven (1) according to claim 16, wherein said second cooking chamber outlet (10) is fluidly connected to said grease conduit (6) via a connection duct (50) whose end portion (50a) protrudes within said grease conduit (6), substantially perpendicularly to an internal surface of the latter.

18. The cooking oven (1) according to claim 14, and further comprising a cleaning system (70) including a circulation system (7) configured for pumping liquid out of said cooking chamber (2) and for pumping such liquid, or a part thereof, again in said cooking chamber (2).

19. The cooking oven (1) according to claim 18, wherein said first cooking chamber outlet (4) is fluidly connected, in addition to said grease conduit (6), to said circulation system (7).

20. The cooking oven (1) according to claim 18, wherein said second cooking chamber outlet (10) is fluidly connected, in addition to said vapour outlet duct (9), to said circulation system (7).

21. The cooking oven (1) according to claim 18, wherein said circulation system (7) comprises a circulation pump (7a), an aspiration conduit (7b) connecting said circulation pump (7a) to said first cooking chamber outlet (4) and/or to said second cooking chamber outlet (10), and a delivery conduit (7c) connecting said circulation pump (7a) to a washing/rinsing liquid circulation outlet (13) provided in said cooking chamber (2) and configured for allowing washing/rinsing liquid to enter said cooking chamber (2).

22. The cooking oven (1) according to claim 18, wherein said cleaning system (70) comprises a washing/rinsing liquid introduction system (16) configured for taking washing/rinsing liquid within said cooking chamber (2), said washing/rinsing liquid introduction system (16) comprising an introduction conduit (16a) fluidly connected to said cooking chamber (2) and configured for selectively supplying into the latter washing and/or rinsing liquid.

23. The cooking oven (1) according to claim 18,
wherein said circulation system (7) comprises a circulation pump (7a), an aspiration conduit (7b) connecting said circulation pump (7a) to said first cooking chamber outlet (4) and/or to said second cooking chamber outlet (10), and a delivery conduit (7c) connecting said circulation pump (7a) to a washing/rinsing liquid circulation outlet (13) provided in said cooking chamber (2) and configured for allowing washing/rinsing liquid to enter said cooking chamber (2);

wherein said cleaning system (70) comprises a washing/rinsing liquid introduction system (16) configured for taking washing/rinsing liquid within said cooking chamber (2), said washing/rinsing liquid introduction system (16) comprising an introduction conduit (16a) fluidly connected to said cooking chamber (2) and configured for selectively supplying into the latter washing and/or rinsing liquid; and wherein an outlet (16c) of said introduction conduit (16a) is separated from said washing/rinsing liquid circulation outlet (13), or wherein the outlet of said introduction conduit (16a) into said cooking chamber (2) coincides with said washing/rinsing liquid circulation outlet (13).

24. The cooking oven (1) according to claim 21, wherein said aspiration conduit (7b) is fluidly connected to said second cooking chamber outlet (10) via a by-pass conduit (14) fluidly connecting said aspiration conduit (7b) to said vapour outlet duct (9), to which said second cooking chamber outlet (10) is fluidly connected.

25. The cooking oven (1) according to claim 18, wherein said cleaning system (70) comprises a washing/rinsing additive supplying system (27) configured for supplying washing and/or rinsing additives to the internal of said cooking chamber (2), and/or a washing/rinsing additive multi-dosing system (31) configured for supplying to the internal of said cooking chamber (2) metered amounts of washing and/or rinsing additives.

26. The cooking oven (1) according to claim 18, comprising a steam supply system (35) configured for producing and supplying steam into the cooking chamber (2), wherein said cleaning system (70) is configured for supplying a washing/rinsing liquid to said steam supply system (35).

* * * * *